(12) United States Patent
Kang

(10) Patent No.: US 12,455,112 B2
(45) Date of Patent: Oct. 28, 2025

(54) REFRIGERATOR AND METHOD FOR CONTROLLING THEREOF

(71) Applicant: SAMSUNG ELECTRONICS CO., LTD., Suwon-si (KR)

(72) Inventor: Donggyeong Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 224 days.

(21) Appl. No.: 18/373,637

(22) Filed: Sep. 27, 2023

(65) Prior Publication Data

US 2024/0142167 A1    May 2, 2024

Related U.S. Application Data

(63) Continuation of application No. PCT/KR2023/011049, filed on Jul. 28, 2023.

(30) Foreign Application Priority Data

Oct. 27, 2022  (KR) .................... 10-2022-0128927

(51) Int. Cl.
*F25D 29/00* (2006.01)

(52) U.S. Cl.
CPC ........ *F25D 29/00* (2013.01); *F25D 2400/361* (2013.01); *F25D 2700/06* (2013.01); *F25D 2700/12* (2013.01); *F25D 2700/14* (2013.01)

(58) Field of Classification Search
CPC ............... F25D 29/00; F25D 2400/361; F25D 2700/06; F25D 2700/12; F25D 2700/14
See application file for complete search history.

(56) References Cited

U.S. PATENT DOCUMENTS 10,976,715 B2    4/2021  Chae et al.
2018/0003572 A1  1/2018  Garsd et al.
(Continued)

FOREIGN PATENT DOCUMENTS

CN    110006204 A    7/2019
CN    110425817 A    11/2019
(Continued)

OTHER PUBLICATIONS

International Search Report (PCT/ISA/210) issued by the International Searching Authority on Nov. 17, 2023 in International Application No. PCT/KR2023/011049.
(Continued)

*Primary Examiner* — Larry L Furdge
(74) *Attorney, Agent, or Firm* — Sughrue Mion, PLLC

(57) ABSTRACT

A refrigerator includes a cooler configured to adjust a temperature inside the refrigerator, and a processor configured to obtain type information of an object in the refrigerator and current temperature information of the object, compare a current temperature of the object with a first temperature of the object based on the type information and the current temperature information, and based on identifying that the current temperature of the object is higher than the first temperature, identify a first time for the temperature of the object inside the refrigerator to reach the first temperature based on a first setting temperature inside the refrigerator. Based on identifying that the current temperature of the object is lower than the first temperature, identify a second time for the temperature of the object to reach the first temperature after the object is removed.

20 Claims, 21 Drawing Sheets

(56) References Cited

U.S. PATENT DOCUMENTS

2018/0180353 A1   6/2018  Shuntich
2021/0239338 A1*  8/2021  Shim ...................... F25D 29/00
2021/0364226 A1  11/2021  Park

FOREIGN PATENT DOCUMENTS

| JP | 2001-99544 A | 4/2001 |
| JP | 2020 128854 A | 8/2020 |
| KR | 10-2009-0075275 A | 7/2009 |
| KR | 10-2011-0000938 A | 1/2011 |
| KR | 10-2019-0102141 A | 9/2019 |
| KR | 10-2018454 B1 | 9/2019 |
| KR | 10-2251789 B1 | 5/2021 |
| KR | 10-2021-0097336 A | 8/2021 |
| KR | 10-2021-0123165 A | 10/2021 |
| KR | 10-2022-0076633 A | 6/2022 |
| KR | 10-2022-0086268 A | 6/2022 |
| WO | WO2022202087 A1 * | 2/2022 |

OTHER PUBLICATIONS

Written Opinion (PCT/ISA/237) issued by the International Searching Authority on Nov. 17, 2023 in International Application No. PCT/KR2023/011049.
Communication dated Jun. 26, 2025 issued by the European Patent Office in European Patent Application No. 23875025.1.

* cited by examiner

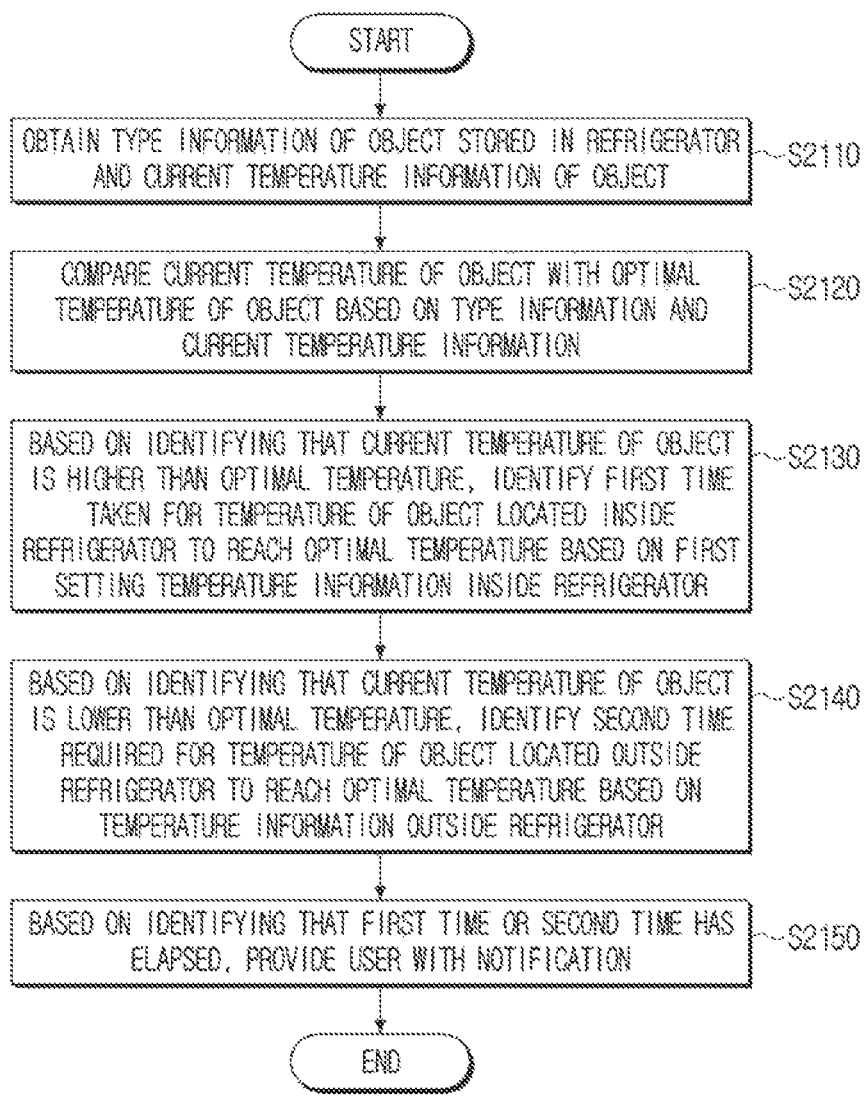

REFRIGERATOR AND METHOD FOR CONTROLLING THEREOF

CROSS-REFERENCE TO RELATED APPLICATION(S)

This application is a by-pass continuation application of International Application No. PCT/KR2023/011049, filed on Jul. 28, 2023, which is based on and claims priority to Korean Patent Application No. 10-2022-0128927, filed on Oct. 7, 2022, in the Korean Intellectual Property Office, the disclosures of which are incorporated by reference herein their entireties.

BACKGROUND

1. Field

The disclosure relates to a refrigerator and a control method thereof and, more particularly, to a refrigerator for providing an object stored in a refrigerator at an optimal temperature at a target time set by a user, and a control method thereof.

2. Description of Related Art

A refrigerator is used to store food or beverages in a fresh state. A refrigerator may include a cooling unit including a compressor, a condenser, an expander, and an evaporator which circulate a refrigerant and form a cooling cycle. The refrigerator maintains the temperature of a storage space inside the refrigerator at a lower temperature than room temperature through a cooling unit so that food or beverage may be stored for a long time in a fresh state.

The food or beverage stored in the refrigerator has the temperature for taste of food or drink that is most suitable for each characteristic. The most suitable temperature for taste of food or drink is frequently different from the room temperature of the outside of the refrigerator or the set temperature inside the refrigerator.

In order to provide a user with food or beverage at a temperature most suitable for a taste of food or drink as described above, a related art refrigerator may adjust the temperature to a desired setting temperature or set a storage environment corresponding to characteristics of food or beverage.

Therefore, there is a need to determine the time taken to reach the most suitable temperature for taste of a food or drink based on the characteristics of the food or beverage stored in the refrigerator and the current temperature information and the like, and to provide food or beverage at a temperature that is most suitable for the taste of food or drink at a desired time set by the user.

SUMMARY

According to an aspect of the disclosure, a refrigerator includes: a user interface; a temperature sensor configured to sense a temperature outside the refrigerator; a cooler configured to adjust a temperature inside the refrigerator; a memory configured to store at least one instruction; and one or more processors configured to execute the at least one instruction to: obtain type information of an object in the refrigerator and current temperature information of the object, compare a current temperature of the object with a first temperature of the object based on the type information and the current temperature information, based on identifying that the current temperature of the object is higher than the first temperature, identify a first time for the temperature of the object inside the refrigerator to reach the first temperature based on a first setting temperature inside the refrigerator, based on identifying that the current temperature of the object is lower than the first temperature, identify a second time for the temperature of the object to reach the first temperature after the object is removed from the refrigerator based on outside temperature information of the refrigerator, and based on identifying that at least one of the first time or the second time has elapsed, provide a notification.

The one or more processors are further configured to execute the at least one instruction to, based on identifying that the current temperature of the object is lower than the first temperature, provide a notification to remove the object from the refrigerator.

The one or more processors are further configured to execute the at least one instruction to obtain the current temperature information of the object based on information about at least one of the temperature outside the refrigerator or the first setting temperature inside the refrigerator.

The one or more processors are further configured to execute the at least one instruction to: identify a target time set via the user interface; based on the identified first time not exceeding the target time, identify a third time for storing the object in the refrigerator based on the first setting temperature inside the refrigerator and the outside temperature information of the refrigerator, and identify a fourth time for the object to reach the first temperature after the third time has elapsed; and based on identifying that the third time has elapsed, output a notification to remove the object from the refrigerator; and based on identifying that the fourth time has elapsed, provide a notification that the fourth time has elapsed.

The one or more processors are further configured to execute the at least one instruction to: identify a target time set using the user interface, based on the identified first time exceeding the target time, identify a fifth time for the object located inside the refrigerator to reach the first temperature based on a second setting temperature inside the refrigerator, and based on the fifth time not exceeding the target time, identify a sixth time of storing the object in the refrigerator based on the second setting temperature inside the refrigerator and the outside temperature information of the refrigerator and a seventh time required for the object located outside the refrigerator to reach the first temperature after the sixth time has elapsed, based on identifying that the sixth time has elapsed, provide a notification to remove the object from the refrigerator, and based on identifying that the seventh time has elapsed, provide a notification that the seventh time has elapsed.

The one or more processors are further configured to execute the at least one instruction to, based on the fifth time exceeding the target time, provide a notification that the first temperature is not reachable within the target time.

The one or more processors are further configured to execute the at least one instruction to, based on the fifth time not exceeding the target time, provide a notification to change a storage location of the object to a storage location corresponding to the second setting temperature.

The one or more processors are further configured to execute the at least one instruction to, based on the fifth time not exceeding the target time, provide a notification to change a setting temperature inside the refrigerator to the second setting temperature.

The one or more processors are further configured to execute the at least one instruction to: identify a target time set using the user interface, based on the identified second time not exceeding the target time, identify an eighth time corresponding to a difference between the target time and the second time, based on identifying that the eighth time has elapsed, provide a notification to remove the object from the refrigerator, and based on identifying that the target time has elapsed, provide a notification that the target time has elapsed.

The one or more processors are further configured to execute the at least one instruction to: identify a target time set using the user interface, based on the identified second time exceeding the target time, provide a notification to remove the object from the refrigerator and information that the second time exceeds the target time, and based on identifying that the second time has elapsed, provide a notification that the second time has elapsed.

The one or more processors are further configured to execute the at least one instruction to, based on identifying that the current temperature of the object is same as the first temperature, provide a notification to remove the object from the refrigerator.

The first temperature of the object may be higher than the first setting temperature inside the refrigerator and lower than the temperature outside the refrigerator.

According to an aspect of the disclosure, a method of controlling a refrigerator, includes: obtaining type information of an object in the refrigerator and current temperature information of the object; comparing a current temperature of the object with a first temperature of the object based on the type information and the current temperature information; based on identifying that the current temperature of the object is higher than the first temperature, identifying a first time for the temperature of the object inside the refrigerator to reach the first temperature based on a first setting temperature inside the refrigerator; based on identifying that the current temperature of the object is lower than the first temperature, identifying a second time for the temperature of the object to reach the first temperature after the object is removed from the refrigerator based on outside temperature information of the refrigerator; and based on identifying that at least one of the first time or the second time has elapsed, providing a notification.

The identifying the second time may include, based on identifying that the current temperature of the object is lower than the first temperature, providing a notification to remove the object from the refrigerator.

The obtaining the current temperature information of the object may include obtaining the current temperature information of the object based on information about at least one of the temperature outside the refrigerator or the first setting temperature inside the refrigerator.

According to an aspect of the disclosure, a refrigerating device includes: a cooler configured to adjust a temperature inside the refrigerating device; a memory configured to store at least one instruction; and at least one processor configured to execute the at least one instruction to: obtain type information of an object in the refrigerating device and current temperature information of the object, compare a current temperature of the object with a first temperature of the object based on the type information and the current temperature information, based on identifying that the current temperature of the object is higher than the first temperature, identify a first time for a temperature of the object inside the refrigerating device to reach the first temperature based on first setting temperature inside the refrigerating device, based on identifying that the current temperature of the object is lower than the first temperature, identify a second time for the temperature of the object to reach the first temperature after the object is removed from the refrigerating device based on outside temperature information of the refrigerating device, and based on identifying that at least one of the first time or the second time has elapsed, provide a notification.

The at least one processor may be further configured to execute the at least one instruction to, based on identifying that the current temperature of the object is lower than the first temperature, provide a notification to remove the object from the refrigerating device.

The at least one processor may be further configured to execute the at least one instruction to obtain the current temperature information of the object based on information about a temperature outside the refrigerating device or the first setting temperature inside the refrigerating device.

The at least one processor may be further configured to execute the at least one instruction to: identify a target time; based on the identified first time not exceeding the target time, identify a third time for storing the object in the refrigerating device based on the first setting temperature inside the refrigerating device and the outside temperature information of the refrigerating device, and identify a fourth time for the object to reach the first temperature after the third time has elapsed; and based on identifying that the third time has elapsed, provide a notification to remove the object from the refrigerating device, and based on identifying that the fourth time has elapsed, provide a notification that the fourth time has elapsed.

The target time may be set by a user input.

BRIEF DESCRIPTION OF THE DRAWINGS

The above and other aspects, and advantages of certain embodiments of the disclosure will be more apparent from the following detailed description, taken in conjunction with the accompanying drawings, in which:

FIG. 21 is a flowchart illustrating an operation of a refrigerator according to one or more embodiments of the disclosure.

DETAILED DESCRIPTION

Figure 1:
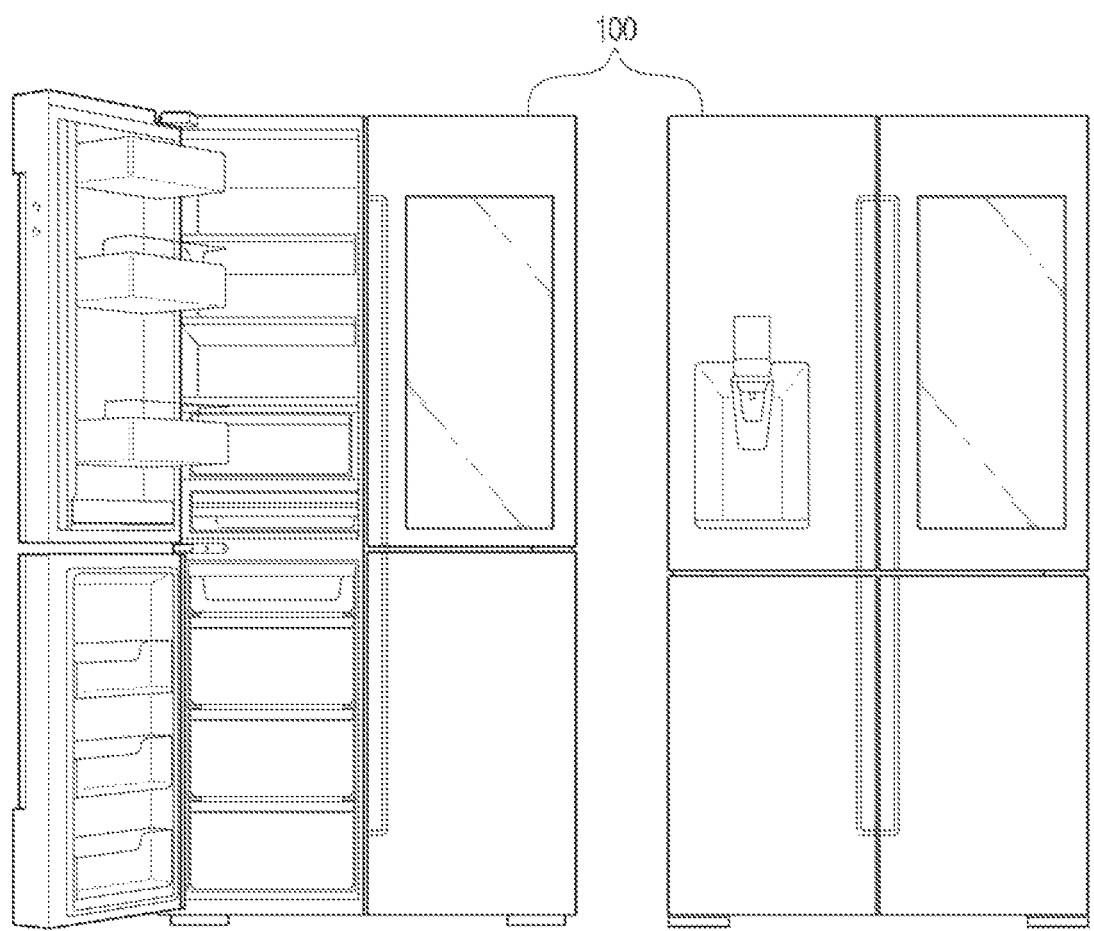
FIG. 1 is a diagram illustrating a refrigerator, according to one or more embodiments of the disclosure.

The disclosure describes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the disclosure. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like, include all possible combinations of the listed items. For example, "A or B," "at least one of A and B," or "at least one of A or B" includes (1) at least one A, (2) at least one B, and/or (3) A and B.

Expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element (e.g., a third element).

When an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of" The expression "configured to" does not necessarily mean "specifically designed to" in a hardware sense.

Under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

The various elements and regions in the drawings are schematically drawn. Accordingly, the technical spirit of the disclosure is not limited by the relative size or spacing depicted in the accompanying drawings.

Hereinafter, with reference to the attached drawings, embodiments will be described in detail so that those skilled in the art to which the disclosure belongs to can easily make and use the embodiments.

FIG. 1 is a diagram illustrating a refrigerator 100 according to one or more embodiments of the disclosure.

Referring to FIG. 1, the disclosure may relate to a refrigerator 100, but is not limited thereto, and may be related to various cooling devices having a storage space for storing food or beverage therein, a storage device, for example, a liquor storage device, a wine refrigerator 100, a kimchi refrigerator 100, a refrigeration device, a refrigeration container, a freezing device, a freezing container, a freezer, and the like.

Figure 2:
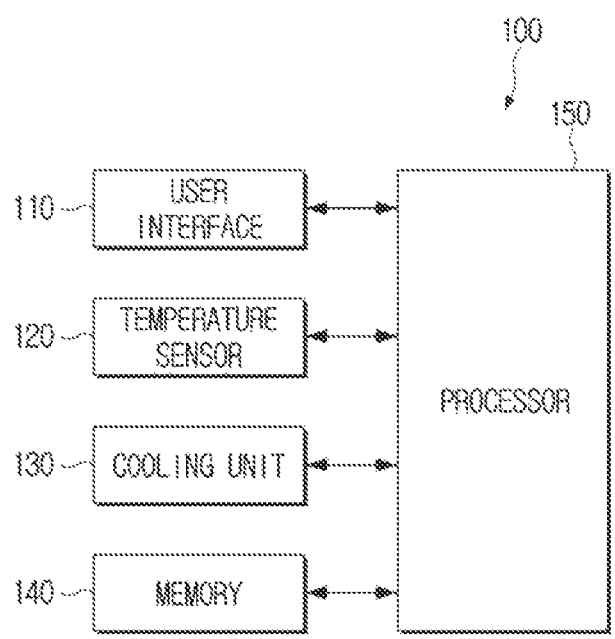
FIG. 2 is a block diagram illustrating a configuration of a refrigerator, according to one or more embodiments of the disclosure.

FIG. 2 is a block diagram illustrating a configuration of a refrigerator 100 according to one or more embodiments of the disclosure.

Referring to FIG. 2, the refrigerator 100 having at least one storage space therein may include a user interface 110, a temperature sensor 120, a cooling unit (or cooler) 130, a memory 140, and at least one processor 150, but is not limited thereto, and various configurations necessary for operation of the refrigerator 100 may be further included or some configurations may be omitted.

The user interface 110 may include a button, a lever, a switch, a touch-type interface, and the like, and the touch-type interface may be implemented in a manner of receiving input by a user's touch through a touch panel on the display 170 screen provided in one area of the refrigerator 100.

The touch panel may include a capacitive touch panel that detects changes in electrical signals, a pressure-sensitive touch panel that senses physical pressure, an infrared touch panel that forms an infrared grid to detect changes in the infrared grid, and a surface ultrasonic touch panel that forms an ultrasonic grid to detect changes in the ultrasonic grid.

The processor 150 may receive an input to select or add an object (e.g., food, beverage, alcohol, food ingredients, etc.) stored inside the refrigerator 100 through the user interface 110.

The processor 150 may receive an input to set an alarm when time required for the temperature of an object to reach optimal temperature has elapsed through the user interface 110.

The temperature sensor 120 may be a contact temperature sensor or a non-contact temperature sensor. The temperature sensor 120 may be a thermocouple temperature sensor, a resistance temperature sensor, an infrared temperature sensor, a bimetal temperature sensor, a liquid expansion temperature sensor, and/or a state change temperature sensor.

The processor 150 may obtain temperature outside the refrigerator 100 by sensing temperature outside the refrigerator 100 through the temperature sensor 120.

In addition, the processor 150 may obtain temperature information inside the refrigerator 100 by sensing the temperature inside the refrigerator 100 through the temperature sensor 120. The processor 150 may control the cooling unit 130 such that the sensed temperature inside the refrigerator 100 is equal to the set temperature inside the refrigerator 100 when the sensed temperature inside the refrigerator 100 is different from the set temperature inside the refrigerator 100.

The cooling unit (or cooler) 130 may include a compressor, a condenser, an expander, and an evaporator through which a refrigerant circulates, but is not limited thereto. The refrigerant is subjected to compression, condensation, expansion and evaporation processes and a cooling cycle is implemented.

The processor 150 may control the cooling unit 130 to adjust the temperature inside the refrigerator 100. The processor 150 may control the cooling unit 130 such that the temperature inside the refrigerator corresponds to a set temperature inside the refrigerator 100.

The memory 140 temporarily or non-temporarily stores various programs or data and transmits the stored information to the processor 150 according to a call of the processor 150. The memory 140 may store various types of information required for operations, processing, and control operations of the processor 150 in an electronic format.

The memory 140 may include, for example, at least one of a main memory device and an auxiliary memory device. The main memory device may be implemented using a semiconductor storage medium such as a ROM and/or a RAM. The ROM may include, for example, a conventional ROM, an EPROM, an EEPROM, and/or a MASK-ROM. The RAM may include, for example, a DRAM and/or an SRAM. The auxiliary memory device may be implemented using at least one storage medium that may be permanently or semi-permanently stored, such as an optical media such as a flash memory 140, a secure digital (SD) card, a Solid State Drive (SSD), a Hard Disc Drive (HDD), a magnetic drum, a compact disc (CD), a DVD or a laser disc, a magnetic tape, a magneto-optical disc, and/or a floppy disk.

The memory 140 may store type information of an object stored in the refrigerator 100. The type information of the object may be information on the capacity of the object, the type of the object, the physical properties of the object, the optimal temperature of the object, and the like.

The memory 140 may store current temperature information of the object. The current temperature information of the object may correspond to a temperature outside the refrigerator or a set temperature inside the refrigerator 100. In addition, the current temperature information of the object may be obtained based on the type of the object, the physical properties of the object, the cold storage time of the object, and the like.

The memory 140 may store information on the set temperature inside the refrigerator 100, information on the temperature outside the refrigerator 100, or the like.

The memory 140 may store information about the time taken for the current temperature of the object to reach the optimal temperature based on the capacity of object, type of object, and property of object.

Also, the memory 140 may store a neural network model utilized to calculate the time it takes for the current temperature of the object to reach the optimal temperature. The memory 140 may store information on layers, nodes, weights, learning data, output data, and the like constituting a neural network model.

The memory 140 may store notification information notifying that the temperature of an object has reached an optimal temperature. The memory 140 may store information about a target time input by a user.

The memory 140 may store information provided to the user, for example, information indicating that the object needs to be taken out of the refrigerator 100, information indicating that the temperature of the object cannot reach the optimal temperature within the target time, information to change the storage location of the object, information to change the set temperature inside the refrigerator 100, and the like.

The memory 140 may store various information for operations of the processor 150 or information obtained by the operations of the processor 150.

One or more processors 150 control the overall operation of the electronic device. Specifically, the processor 150 is connected to the configuration of the electronic device including the memory 140 described above, and executes at least one instruction stored in the memory 140 as described above, thereby overall controlling the operation of the electronic device. In particular, the processor 150 may be implemented as a plurality of processors 150 or a single processor 150.

The processor 150 may be implemented in a variety of ways. For example, the processor 150 may be implemented as at least one of an application specific integrated circuit (ASIC), an embedded processor, a microprocessor, hardware control logic, a hardware finite state machine (FSM), a digital signal processor (DSP), or the like.

The processor 150 may include one or more among a central processor (CPU), a micro controller unit (MCU), a micro processor (MPU), a controller, an application processor (AP), a communication processor (CP), an advanced reduced instruction set computing (RISC) machine (ARM) processor, a dedicated processor, or may be defined as a corresponding term. The processor 150 may be implemented in a system on chip (SoC) type or a large scale integration (LSI) type which a processing algorithm is built therein, application specific integrated circuit (ASIC), or in a field programmable gate array (FPGA) type. The processor 150 may perform various functions by executing computer executable instructions stored in the memory 140. In addition, the processor 150 may include at least one of a graphics-processing unit (GPU), a neural processing unit (NPU), and a visual processing unit (VPU) that is a separate AI dedicated processor in order to perform an artificial intelligence function.

One or more processors 150 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. The one or more processors 150 may control one or any combination of other components of the electronic device and may perform operations or data processing relating to the communication. The one or more processors 150 may execute one or more programs or instructions stored in the memory 140. For example, the one or more processors 150 may perform the method according to one or more embodiments of the disclosure by executing one or more instructions stored in the memory 140.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all the first operation, the second operation, and the third operation may be performed by the first processor, the first operation and the second operation may be performed by the first processor (for example, the general purpose processor), and the third operation may be performed by the second processor (for example, the artificial intelligence dedicated processor).

One or more processors 150 may be implemented as a single core processor including one core, and may be implemented with one or more multicore processors including a plurality of cores (e.g., homogeneous multi-cores or heterogeneous multi-cores). When one or more processors 150 are implemented as a multi-core processor, each of the plurality of cores included in the multi-core processor may include an internal memory of the processor such as an on-chip memory, and a common cache shared by the plurality of cores may be included in the multi-core processor. In addition, each of a plurality of cores (or a portion of a plurality of cores) included in the multi-core processor may independently read and perform a program command for implementing a method according to one or more embodiments of the disclosure, and may read and perform a program command for implementing a method according to one or more embodiments of the disclosure in connection with the entire core (or a portion) of a plurality of cores.

When the method according to one or more embodiments of the disclosure includes a plurality of operations, the plurality of operations may be performed by one of a plurality of cores included in the multi-core processor or may be performed by the plurality of cores. For example, when a first operation, a second operation, and a third operation are performed by a method according to one or more embodiments, all of a first operation, a second operation, and a third operation may be performed by a first core included in the multi-core processor, and the first operation and the second operation may be performed by a first core included in the multi-core processor, and the third operation may be performed by a second core included in the multi-core processor.

According to embodiments of the disclosure, the processor may mean a system-on-chip (SoC) in which one or more processors 150 and other electronic components are integrated, a single core processor, a multi-core processor, or a core included in a single core processor or a multi-core processor, wherein the core may be implemented as a CPU, a GPU, an APU, an MIC, a DSP, an NPU, a hardware accelerator, or a machine learning accelerator, but embodiments of the disclosure are not limited thereto.

The processor 150 may acquire type information of an object stored in the refrigerator 100 and current temperature information of the object. The object may be a liquor including wine, but is not limited thereto, and may include various food, beverages, alcoholic beverages, food ingredients, and the like.

The processor 150 may compare the current temperature of the object with the optimal temperature of the object based on the type information of the object and the current temperature information of the object. The optimal temperature of the object may mean the most suitable temperature for tasting the object by eating or drinking (hereinafter, tasting).

Based on identifying that the current temperature of the object is higher than the optimal temperature, the processor 150 may identify a first time required for the temperature of an object located in the refrigerator 100 to reach an optimal temperature based on first setting temperature information inside the refrigerator 100.

Based on identifying that the current temperature of the object is lower than the optimal temperature, the processor 150 may identify a second time required for the temperature of the object located outside the refrigerator to reach the optimal temperature based on the temperature information outside the refrigerator.

Based on identifying that the current temperature of the object is identified as being low, the processor 150 may provide a user with information to take out an object from the refrigerator 100.

The processor 150 may provide a user with a notification if it is identified that the first time or second time has passed.

The more specific control operation of the refrigerator 100 of the processor will be described along with FIGS. 3 to 18.

The operation for controlling the refrigerator 100 of the processor 150 will be described with reference to FIGS. 3 to 6 when a target time, which is a time taken from a current time point to a time point at which the user wants to taste the object, is not set.

Figure 3:
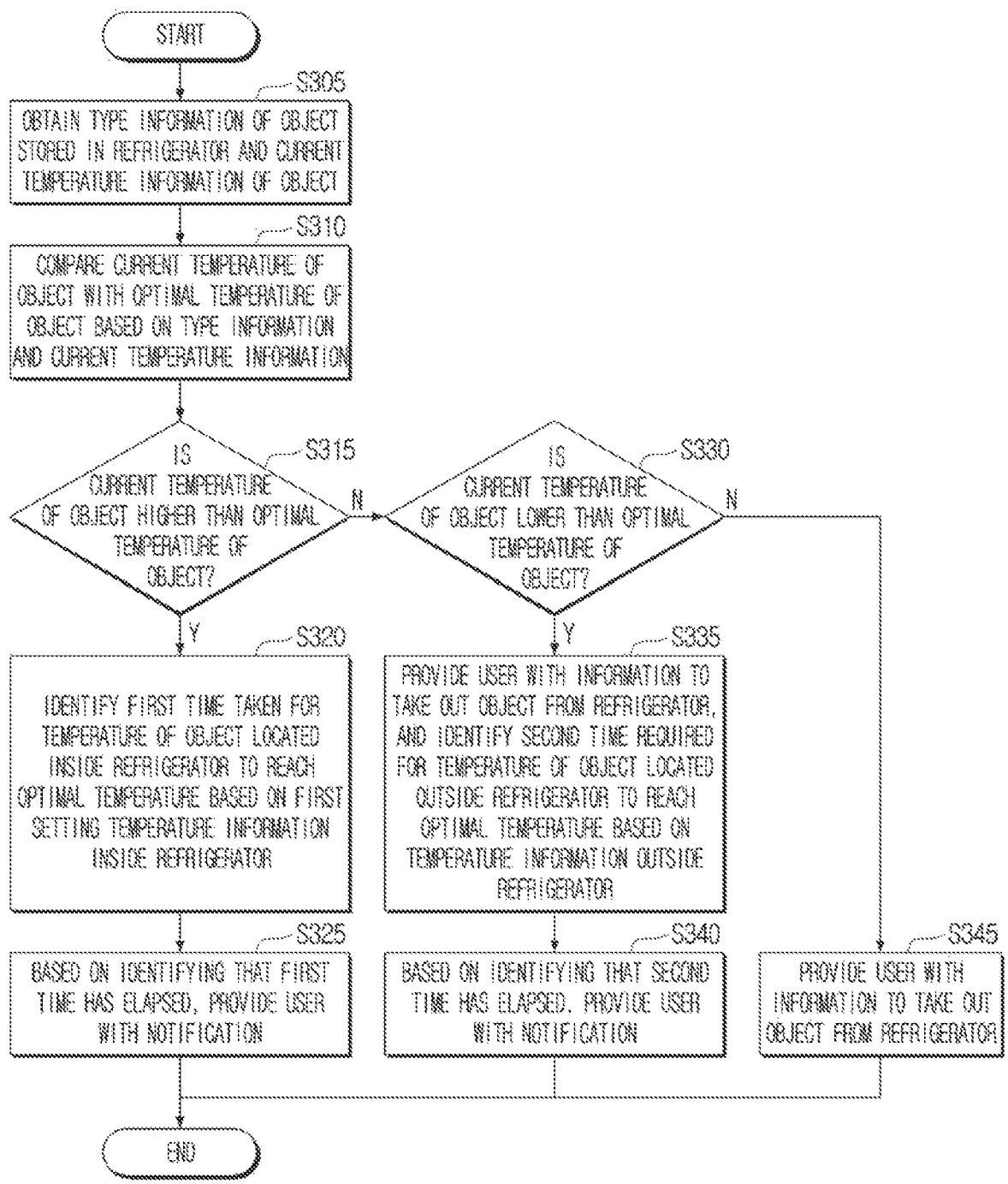
FIG. 3 is a flowchart illustrating an operation of a refrigerator, according to one or more embodiments of the disclosure.

FIG. 3 is a flowchart illustrating an operation of a refrigerator 100 according to one or more embodiments of the disclosure.

Referring to FIG. 3, the processor 150 may obtain the object type information and current temperature information of the object stored in the refrigerator 100 in operation S305.

The type information of the object may be information on the type of the object (e.g., food, beverage, alcoholic beverage, food ingredients, etc.), physical properties (e.g., viscosity, thermal conductivity, etc.) of the object, a capacity of the object, an optimal temperature of the object, and the like. The optimal temperature of the object may refer to a temperature that is most suitable for tasting an object, but is not limited thereto.

For example, when an object entering the refrigerator 100 is a wine, the processor 150 may receive type information (e.g., type of wine, thermal conductivity of wine, capacity of wine, optimal temperature of wine, etc.) of the wine through the user interface 110.

According to another embodiment of the disclosure, when the processor 150 receives an input indicating the type of an object entering the refrigerator 100 is wine through the user interface 110, the processor 150 may perform communication connection with the server through the communication interface 160 to obtain type information (e.g., type of wine, thermal conductivity of wine, capacity of wine, optimal temperature of wine, and the like) of wine to be entered.

According to another embodiment, the processor 150 may obtain type information of the object by identifying what is an object entering the refrigerator 100 through a camera provided in the refrigerator 100. The processor 150 may use a first neural network model (for example, an image classification model) capable of classifying an image so as to identify an object entering the refrigerator 100 based on an image acquired through the camera, and acquire type information of the object.

The processor 150 may identify, based on the current temperature information of the object, that the current temperature of the object is the same as the temperature outside the refrigerator or the set temperature inside the refrigerator 100. That is, the current temperature of the object may be the same as the temperature outside the refrigerator at the time when the object located outside the refrigerator 100 is stored in the refrigerator 100, and the current temperature of the object sufficiently stored for a predetermined time or more inside the refrigerator 100 may be identified to be the same as the set temperature inside the refrigerator 100.

According to another embodiment, the processor 150 can obtain current temperature information of the object based on temperature information outside the refrigerator, setting temperature information inside the refrigerator 100, a capacity of an object stored in the refrigerator 100, type information of the object, and a time when the object is stored in the refrigerator 100.

That is, when it is not the time when the object enters the refrigerator 100 and the object is not sufficiently stored in the refrigerator 100 for a predetermined time or longer, the current temperature of the object may be lower than the temperature outside the refrigerator 100 and higher than the set temperature inside the refrigerator 100.

The processor 150 may identify a current temperature of the object based on temperature information outside the refrigerator 100, setting temperature information inside the refrigerator 100, a capacity of an object stored in the refrigerator 100, type information of the object, and a time when the object is stored in the refrigerator 100.

The processor 150 may obtain current temperature information of the object from temperature information outside the refrigerator 100, setting temperature information of the refrigerator 100, a capacity of an object stored in the refrigerator 100, type information of the object, and a current temperature of an object corresponding to a time when the object is stored in the refrigerator 100.

The processor 150 may compare the current temperature of the object with the optimal temperature of the object based on the type information of the object and the current temperature information of the object as described above in operation S310.

The processor 150 may identify whether the current temperature of the object is higher, lower, or equal to the optimal temperature of the object based on the type information of the object and the current temperature information of the object.

The processor 150 may identify whether the current temperature of the object is higher than the optimal temperature of the object in operation S315.

Based on identifying that the current temperature of the object is higher than the optimal temperature of the object in operation S315—Y, the processor 150 may identify a first time taken for the temperature of the object located inside the refrigerator 100 to reach the optimal temperature based on the first set temperature information inside the refrigerator 100 in operation S320.

Figure 4:
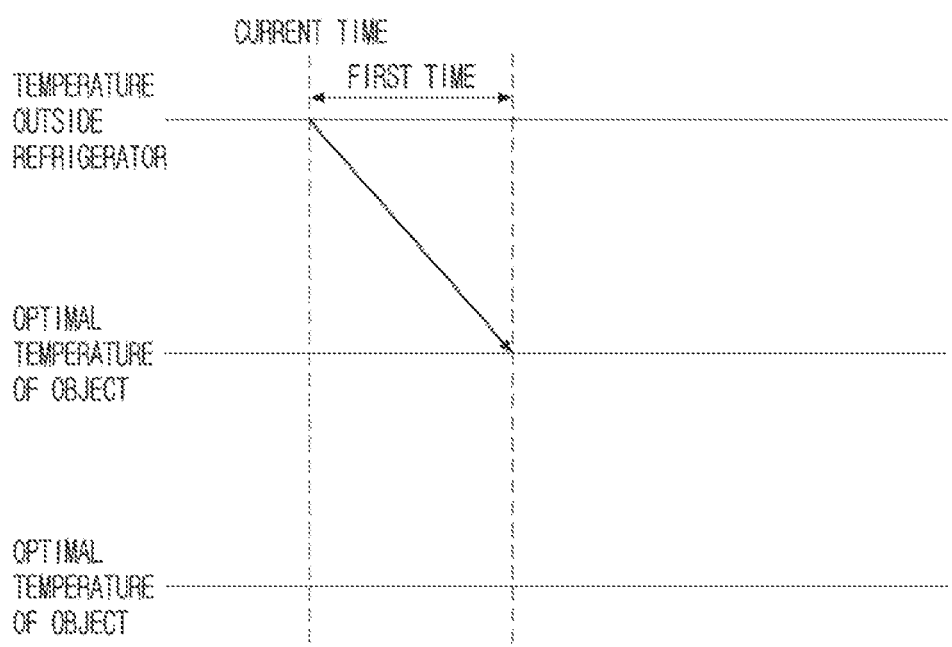
FIG. 4 is a diagram illustrating a first time taken for the temperature of an object to reach an optimal temperature when the current temperature of the object stored in the refrigerator is the same as the temperature outside the refrigerator, according to one or more embodiments of the disclosure.

FIG. 4 is a diagram illustrating a first time taken for the temperature of an object to reach an optimal temperature when the current temperature of the object stored in the refrigerator 100 is the same as the temperature outside the refrigerator 100, according to one or more embodiments of the disclosure.

Referring to FIG. 4, a temperature outside the refrigerator 100 may be higher than a set temperature inside the refrigerator 100, and an optimal temperature of an object stored in the refrigerator 100 may be lower than a temperature outside the refrigerator 100 and higher than a set temperature of the refrigerator 100, but is not limited thereto.

The current temperature of the object may be the same as the temperature outside the refrigerator 100, assuming a time point at which an object located at a room temperature outside the refrigerator starts to be stored in the refrigerator 100.

Based on identifying that the current temperature of the object is higher than the optimal temperature of the object, the processor 150 may identify a first time required for the temperature of the object located in the refrigerator 100 to reach the optimal temperature based on the type information (e.g., the capacity of the object, the type of the object, and the like) of the object and the first setting temperature information inside the refrigerator 100.

In addition, the processor 150 may identify a first time by using a second neural network model (e.g., a time calculation model). The processor 150 may acquire, as output data, a vector value corresponding to the time taken for the current temperature of the object to reach the optimal temperature by inputting type information (for example, the capacity of the object, the type of the object, and the like) of the object, the temperature outside the refrigerator 100, and the set temperature inside the refrigerator 100 to the second neural network model. The processor 150 may train the second neural network model based on the input data and the output data.

Based on identifying that the first time has elapsed, the processor 150 may provide a notification to the user in operation S325. Specifically, based on identifying that the first time has elapsed, the processor 150 may control the speaker 180 to output a voice notifying the user that the object has reached the optimal temperature, or control the display 170 to display a GUI notifying that the object has reached the optimal temperature.

If the current temperature of the object is identified as not higher than the optimal temperature of the object in operation S315—N, the processor 150 may identify whether the current temperature of the object is lower than the optimal temperature of the object in operation S330.

When the processor 150 identifies that the current temperature of the object is lower than the optimal temperature of the object in operation S330—Y, the processor 150 may provide information indicating that the object needs to be taken out from the refrigerator 100 to the user, and identify a second time taken for the temperature of the object located outside the refrigerator 100 to reach the optimal temperature based on the temperature information outside the refrigerator 100.

Figure 5:
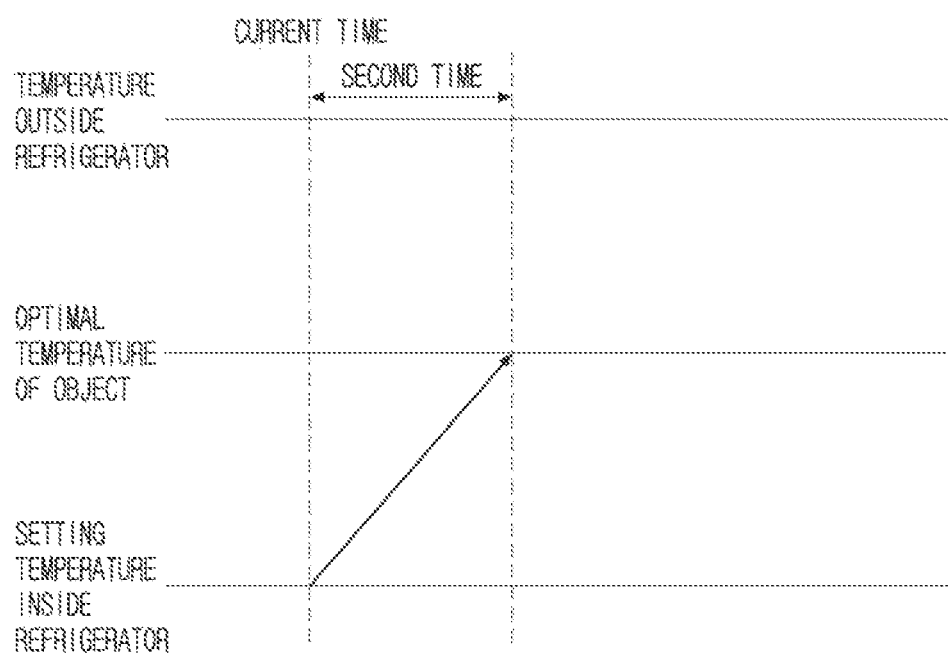
FIG. 5 is a diagram illustrating a second time taken for the temperature of an object to reach an optimal temperature when the current temperature of the object stored in the refrigerator is the same as the set temperature inside the refrigerator, according to one or more embodiments of the disclosure.

FIG. 5 is a diagram illustrating a second time taken for the temperature of an object to reach an optimal temperature when the current temperature of the object stored in the refrigerator 100 is the same as the set temperature inside the refrigerator 100, according to one or more embodiments of the disclosure.

Referring to FIG. 5, assuming that the object is stored inside the refrigerator 100 sufficiently for a preset time or longer, the current temperature of the object may be the same as the first set temperature inside the refrigerator 100.

If it is identified that the current temperature of the object is lower than the optimal temperature of the object, the processor 150 may identify the second time taken for the temperature of the object located outside the refrigerator 100 to reach the optimal temperature based on the information of the temperature outside the refrigerator 100.

Further, the processor 150 may identify the second time using the aforementioned second neural network model (e.g.: time calculation model).

At the same time, if it is identified that the current temperature of the object is lower than the optimal temperature of the object, the processor 150 may provide the user with information to take out the object from the refrigerator 100. The processor 150 may control the speaker 180 to output voice to take out the object from the refrigerator 100 or control the display 170 to display a GUI to take out the object from the refrigerator 100.

The processor 150 may provide the user with a notification if it is identified that the second time has elapsed in operation S340. Specifically, based on identifying that the second time has elapsed, the processor 150 may control the speaker 180 to output a voice notifying the user that the object has reached the optimal temperature, or may control the display 170 to display a GUI notifying that the object has reached the optimal temperature.

If it is identified that the current temperature of the object is not lower than the optimal temperature of the object in operation S330—N, the processor 150 may provide a user with information to take out the object from the refrigerator 100 in operation S345.

Figure 6:
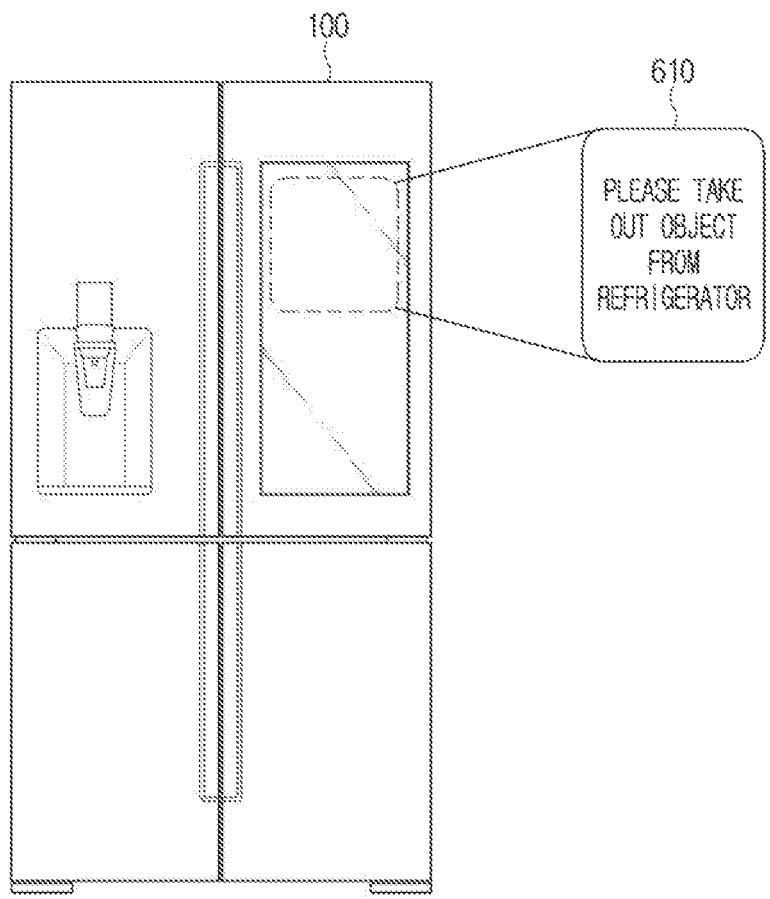
FIG. 6 is a diagram illustrating an operation of providing, to a user, information about taking an object out of a refrigerator, according to one or more embodiments of the disclosure.

FIG. 6 is a diagram illustrating an operation of providing, to a user, information about taking an object out of a refrigerator 100, according to one or more embodiments of the disclosure.

Referring to FIG. 6, the processor 150 may control the speaker 180 to output a voice to take out the object from the refrigerator 100 or control the display 170 to display a GUI for taking out the object from the refrigerator 100.

The operation of controlling the refrigerator 100 of the processor 150 is described in conjunction with FIGS. 7 to 18 when a target time, which is a time taken from the current time point to a time point at which the user wants to taste food or drink, is set.

Figure 7:
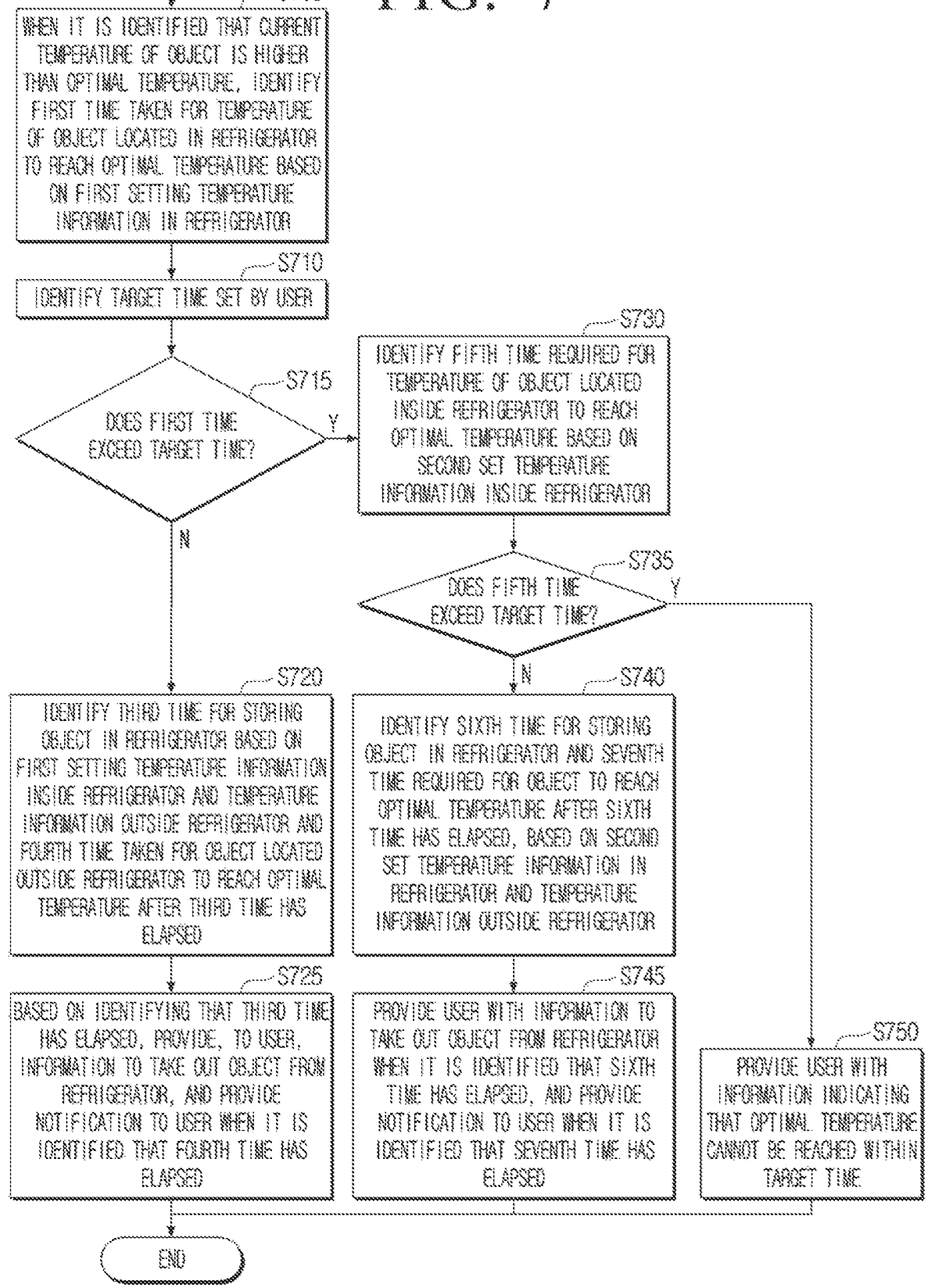
FIG. 7 is a diagram illustrating an operation of a refrigerator when a user sets a target time and a current temperature of an object stored in the refrigerator is the same as a temperature outside the refrigerator, according to one or more embodiments of the disclosure.

FIG. 7 is a diagram illustrating an operation of a refrigerator 100 when a user sets a target time and a current temperature of an object stored in the refrigerator 100 is the same as a temperature outside the refrigerator 100, according to one or more embodiments of the disclosure.

Referring to FIG. 7, based on identifying that the current temperature of the object is higher than the optimal temperature, the processor 150 may identify a first time taken for the temperature of an object located in the refrigerator 100 to reach an optimal temperature based on first setting temperature information in the refrigerator 100 in operation S705.

The processor 150 may receive an input for setting a target time, which is a time taken from the current time point to a desired time point for taste of food or drink through the user interface 110, so as to identify a target time set by the user in operation S710.

The processor 150 may identify whether the first time exceeds the target time in operation S715.

Based on the identified first time not exceeding the target time in operation S715—N, the processor 150 may identify a third time for storing the object in the refrigerator 100 based on first setting temperature information inside the refrigerator 100 and temperature information outside the refrigerator 100 and a fourth time taken for the object to reach the optimal temperature after the third time has elapsed in operation S720.

Figure 8:
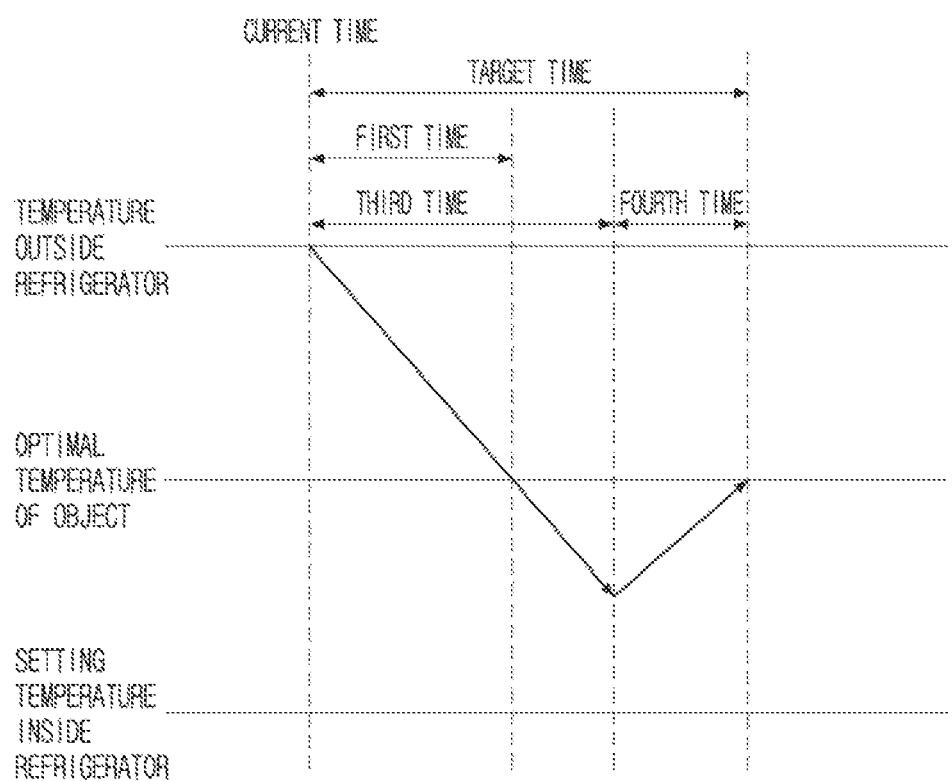
FIG. 8 is a diagram illustrating an operation in which a processor identifies a third time and a fourth time when a first time does not exceed a target time, according to one or more embodiments of the disclosure.

FIG. 8 is a diagram illustrating an operation in which a processor 150 identifies a third time and a fourth time when a first time does not exceed a target time, according to one or more embodiments of the disclosure.

Referring to FIG. 8, the current temperature of the object may be the same as the temperature outside the refrigerator 100, and the optimal temperature of the object may be lower than the temperature outside the refrigerator 100 and higher than the set temperature inside the refrigerator 100, but is not limited thereto.

When the first time required for the temperature of the object to reach the optimal temperature does not exceed the target time, the temperature of the object may reach the optimal temperature before the target time elapses. When the object is stored in the refrigerator 100 after the first time elapses, the temperature of the object reaches a temperature lower than the optimal temperature and reaches a temperature lower than the optimal temperature at the time when the target time elapses.

Accordingly, according to an embodiment, the processor 150 may identify a third time for storing an object in the refrigerator 100 so that the object may be provided at an optimal temperature at a point in time when the target time has elapsed, and a fourth time taken for the object located outside the refrigerator 100 to reach the optimal temperature after the third time has elapsed.

The processor 150 may identify the third time and the fourth time using the second neural network model (e.g.: time calculation model) described above.

The processor 150 may provide, to the user, information to take out the object from the refrigerator 100 based on identifying that the third time has elapsed, and may provide a notification to the user based on identifying that the fourth time has elapsed in operation S725.

If the first time exceeds the target time S715—Y, the processor 150 may identify a fifth time required for the temperature of the object located inside the refrigerator 100 to reach the optimal temperature based on the second set temperature information inside the refrigerator 100 in operation S730.

Figure 9:
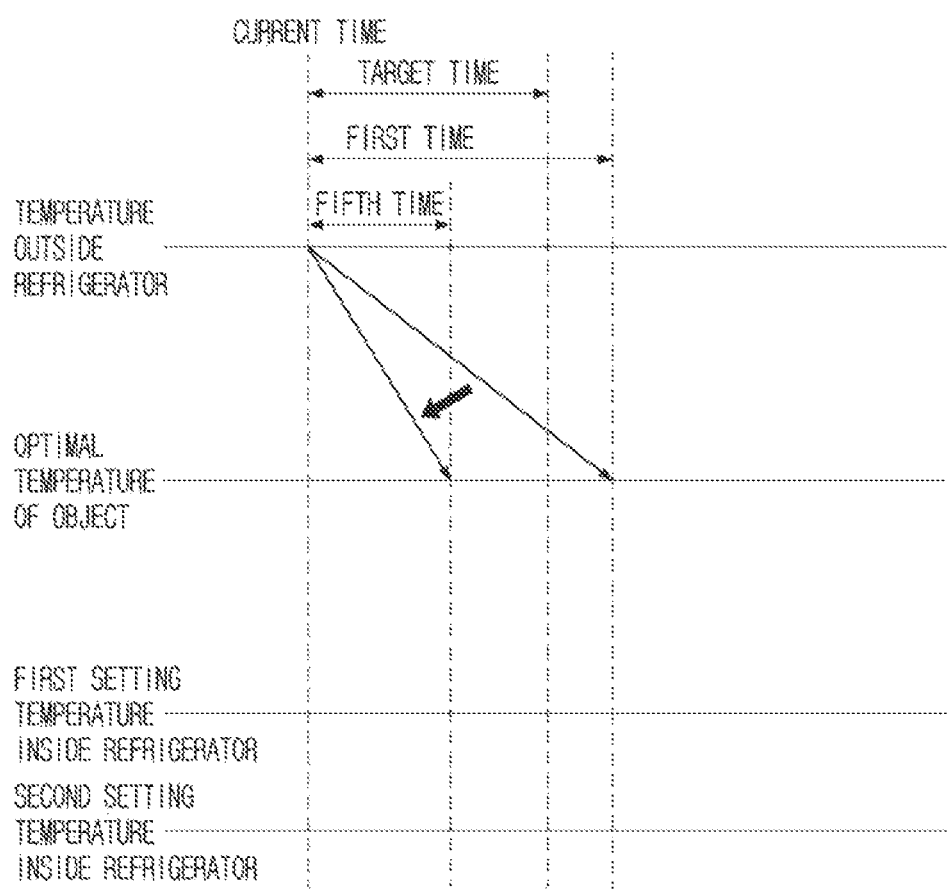
FIG. 9 is a diagram illustrating an operation of identifying a fifth time when a processor does not exceed a target time when a first time exceeds a target time, according to one or more embodiments of the disclosure.

FIG. 9 is a diagram illustrating an operation of identifying a fifth time when a processor 150 does not exceed a target time when a first time exceeds a target time, according to one or more embodiments of the disclosure.

Referring to FIG. 9, when the first time exceeds the target time, if the target time elapses, the temperature of the object may not reach the optimal temperature.

According to an embodiment, the processor may identify a fifth time required for the temperature of an object located in the refrigerator 100 to reach an optimal temperature based on second setting temperature information lower than a first setting temperature inside the refrigerator 100. Since the fifth time is the time identified based on the second set temperature lower than the first set temperature, the fifth time has a smaller value than the first time, and an object located inside the refrigerator 100 may reach the optimal temperature within the target time.

The processor 150 may identify the second neural network model (e.g.: time calculation model).

The processor 150 may identify whether the fifth time exceeds the target time in operation S735.

If it is identified that the fifth time does not exceed the target time in operation S735—N, the processor 150 may identify a sixth time for storing the object in the refrigerator 100 and a seventh time required for the object to reach the optimal temperature after the sixth time have elapsed, based on the second set temperature information in the refrigerator 100 and the temperature information outside the refrigerator 100 in operation S740.

Based on identifying that the fifth time does not exceed the target time in operation S735—N, the processor 150 may provide information to the user to change the storage location of the object to a storage location corresponding to the second set temperature or provide information to the user to change the set temperature inside the refrigerator 100 to the second set temperature.

Figure 10:
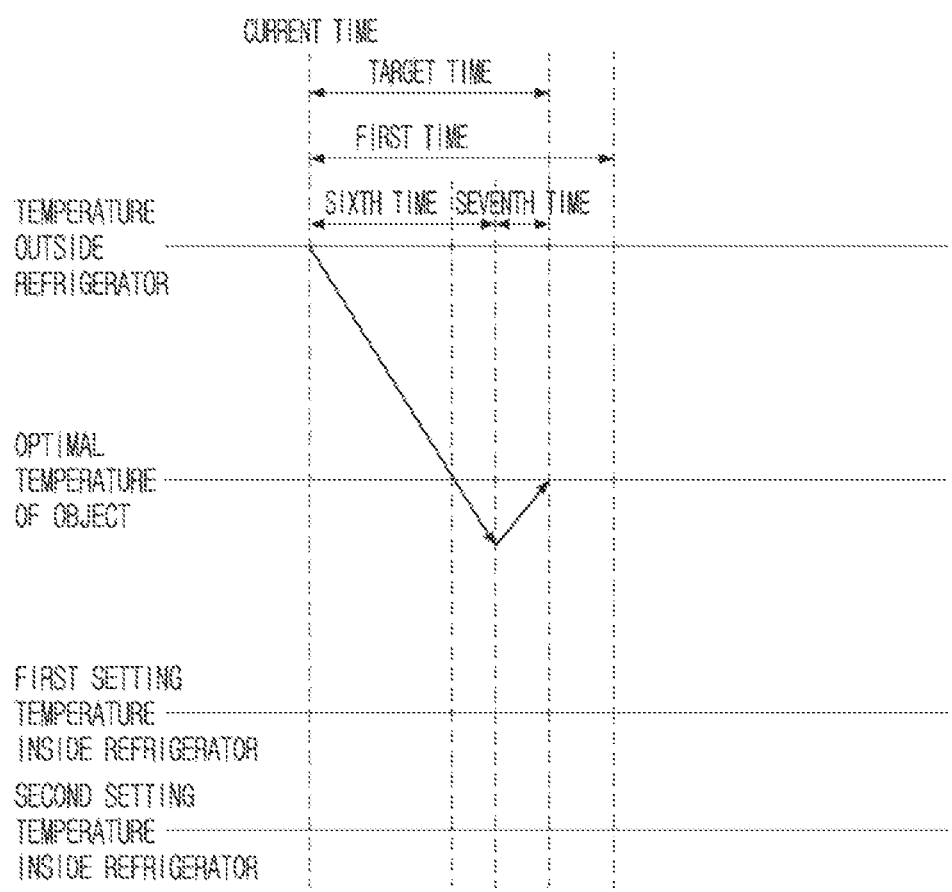
FIG. 10 is a diagram illustrating an operation in which a processor identifies a sixth time and a seventh time when a fifth time does not exceed a target time, according to one or more embodiments of the disclosure.

FIG. 10 is a diagram illustrating an operation in which a processor 150 identifies a sixth time and a seventh time when a fifth time does not exceed a target time, according to one or more embodiments of the disclosure.

Referring to FIG. 10, when the fifth time required for the temperature of the object to reach the optimal temperature does not exceed the target time, the temperature of the object may reach the optimal temperature before the target time elapses. When the object is stored in the refrigerator 100 after the fifth time elapses, the temperature of the object reaches a temperature lower than the optimal temperature and reaches a temperature lower than the optimal temperature at the time when the target time elapses.

Accordingly, the processor 150 may identify a sixth time for storing the object in the refrigerator 100 so that the object may be provided at an optimal temperature at a point in time when the target time has elapsed, and a seventh time taken for the object to reach the optimal temperature after the sixth time has elapsed.

The processor 150 may identify the sixth time and the seventh time by using the second neural network model (e.g.: time calculation model) described above.

The processor 150 may control the speaker 180 or the display 170 to provide the user with information to take out the object from the refrigerator 100 based on identifying that the sixth time has elapsed, and to provide a notification to the user based on identifying that the seventh time has elapsed in operation S745.

If the fifth time is identified as exceeding the target time in operation S735—Y, the processor 150 may control the speaker 180 or the display 170 to provide the user with information indicating that the optimal temperature cannot be reached within the target time in operation S750.

Figure 11:
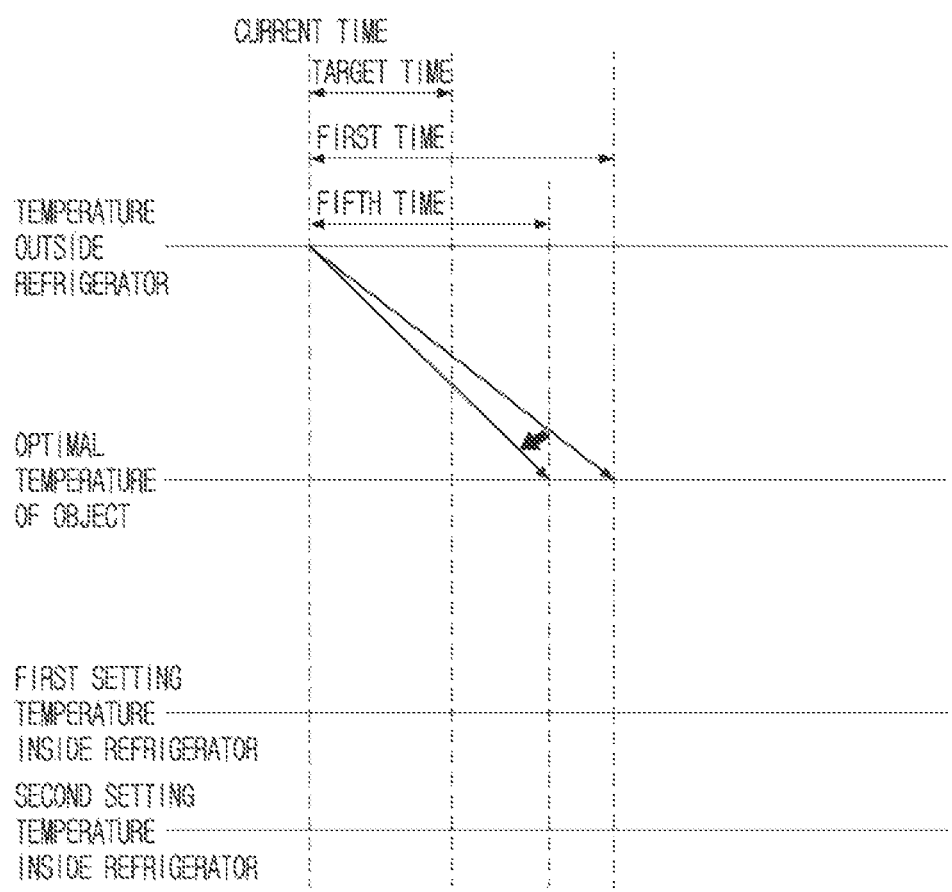
FIG. 11 is a diagram illustrating an operation in which a processor identifies a fifth time exceeding a target time when a first time exceeds a target time, according to one or more embodiments of the disclosure.

FIG. 11 is a diagram illustrating an operation in which a processor 150 identifies a fifth time exceeding a target time when a first time exceeds a target time, according to one or more embodiments of the disclosure.

Referring to FIG. 11, even if an object is stored at a second set temperature in the refrigerator 100, an optimal temperature may not be reached within a target time. The processor 150 may provide the user with information indicating that the optimal temperature cannot be reached within the target time.

Figure 12:
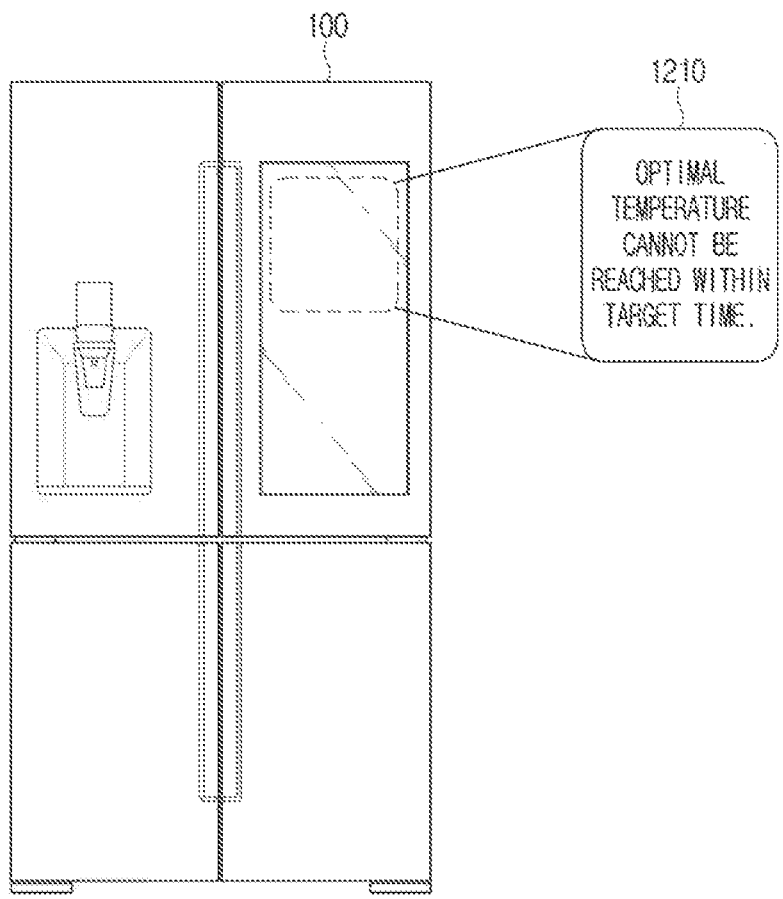
FIG. 12 is a diagram illustrating an operation of providing, to a user, information notifying that a refrigerator cannot reach the optimal temperature within a target time, according to one or more embodiments of the disclosure.

FIG. 12 is a diagram illustrating an operation of providing, to a user, information indicating that the refrigerator 100 cannot reach the optimal temperature within a target time, according to one or more embodiments of the disclosure.

Referring to FIG. 12, the processor 150 may control the speaker 180 to output a voice indicating that an optimal temperature cannot be reached within a target time or to control the display 170 to display a GUI 1210 indicating that the optimal temperature cannot be reached within a target time.

The operation of the processor 150 will be described in detail with reference to FIGS. 13 to 15 when a fifth time required for the temperature of the object located in the refrigerator 100 to reach the optimal temperature does not exceed the target time based on the second set temperature information lower than the first set temperature inside the refrigerator 100.

Figure 13:
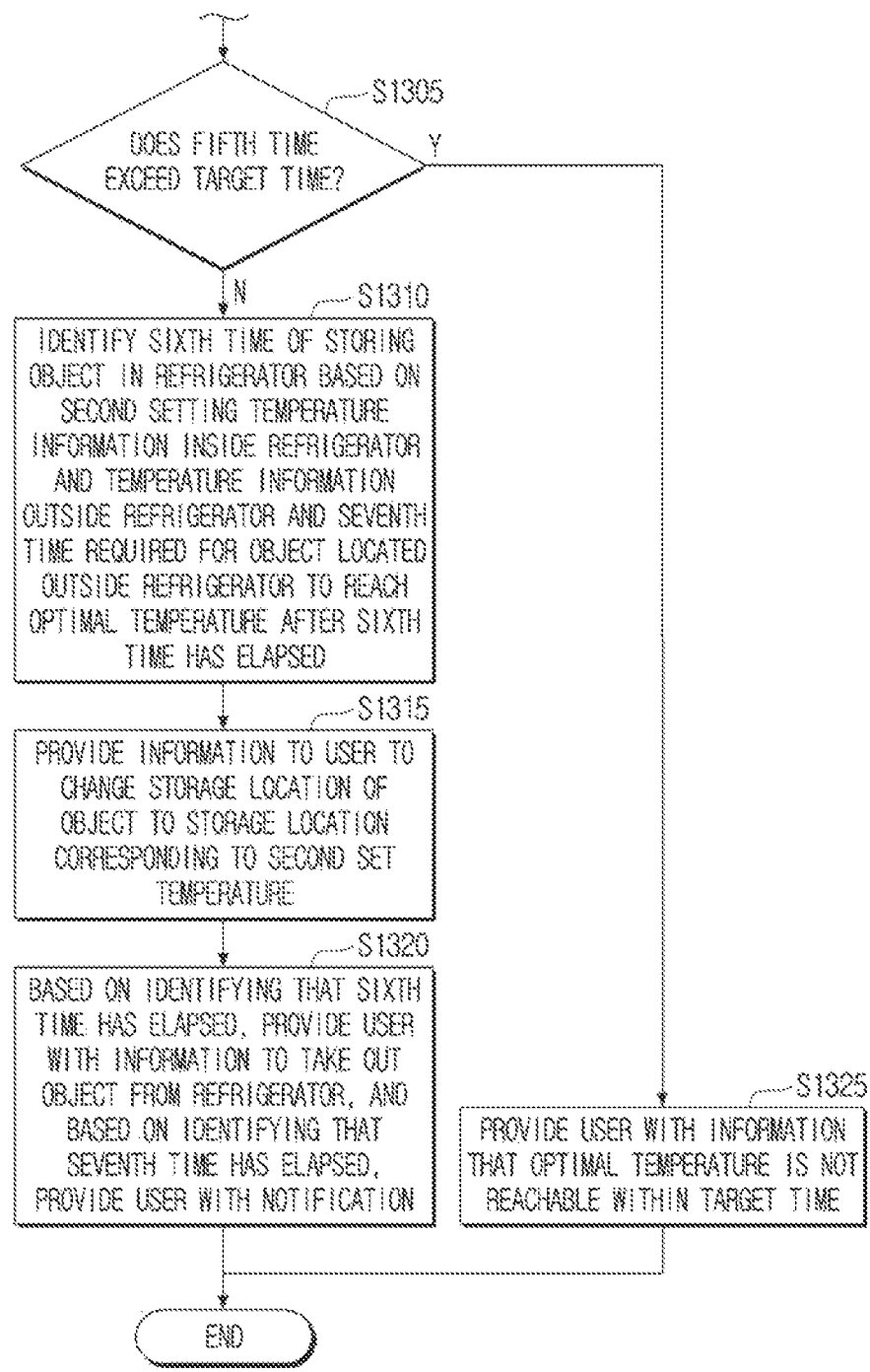
FIG. 13 is a diagram illustrating an operation in which a refrigerator provides information to a user to change a storage location of an object to a storage location corresponding to a second set temperature when a fifth time does not exceed a target time, according to one or more embodiments of the disclosure.

FIG. 13 illustrates that, based on the fifth time not exceeding the target time, the refrigerator 100 may provide a user with information to change a storage location of the object to a storage location corresponding to the second setting temperature.

Referring to FIG. 13, based on the fifth time not exceeding the target time in operation S1305—N, the processor 150 may identify a sixth time of storing the object in the refrigerator 100 based on second setting temperature information inside the refrigerator 100 and temperature information outside the refrigerator 100 and a seventh time required for the object located outside the refrigerator 100 to reach the optimal temperature after the sixth time have elapsed in operation S1310.

The processor 150 may control the speaker 180 or the display 170 to provide information to the user to change the storage location of the object to a storage location corresponding to the second set temperature in operation S1315.

Figure 14:
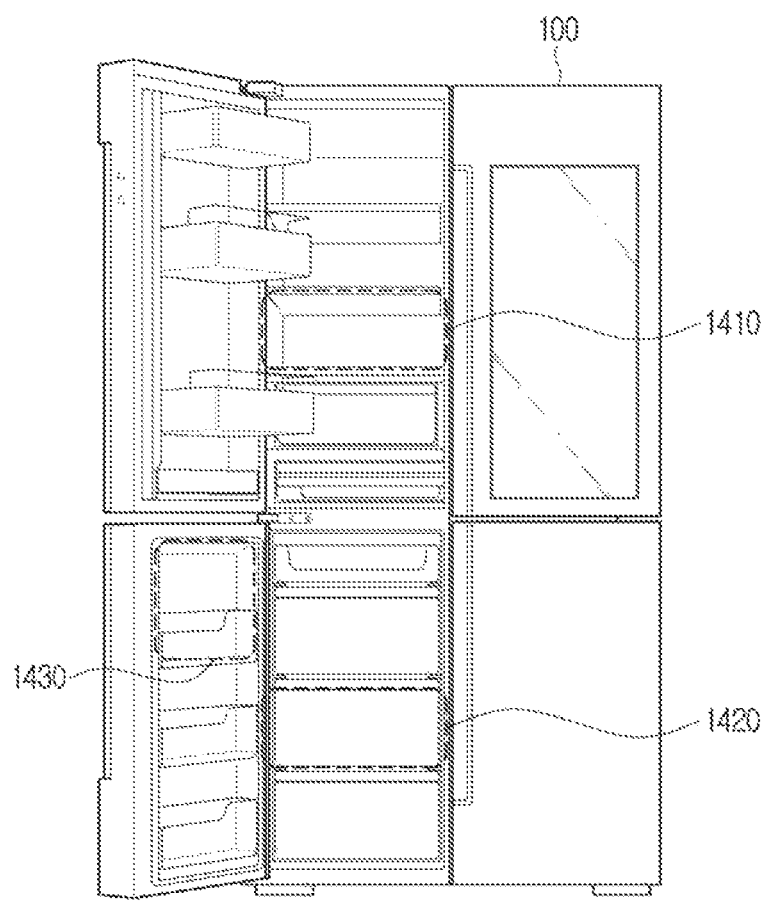
FIG. 14 is a diagram illustrating a storage location inside a refrigerator according to one or more embodiments of the disclosure.

FIG. 14 is a diagram illustrating a storage location inside a refrigerator 100 according to one or more embodiments of the disclosure.

Referring to FIG. 14, the refrigerator 100 may include at least one storage space (or storage location) (1410, 1420, 1430). The processor 150 may allocate different set temperatures for each storage location. The processor 150 may control the cooling unit 130 based on the temperature information set for each storage location.

For example, the temperature corresponding to the first storage location 1410 may be a first set temperature, and the temperature corresponding to the second storage location 1420 may be a second set temperature lower than the first set temperature.

Accordingly, the processor 150 may provide information to the user to change the storage location of the object to a storage location corresponding to the second set temperature. When the storage location of the object is changed to the second storage location corresponding to the second set temperature by the user, the object may reach the optimal temperature within the target time.

Based on identifying that the six time has elapsed, the processor 150 may provide a user with information to take out the object from the refrigerator 100, and based on identifying that the seventh time has elapsed, may provide a user with a notification in operation S1320.

Based on the fifth time exceeding the target time in operation S1305—Y, the processor 150 may provide a user with information that the optimal temperature is not reachable within the target time in operation S1325.

Figure 15:
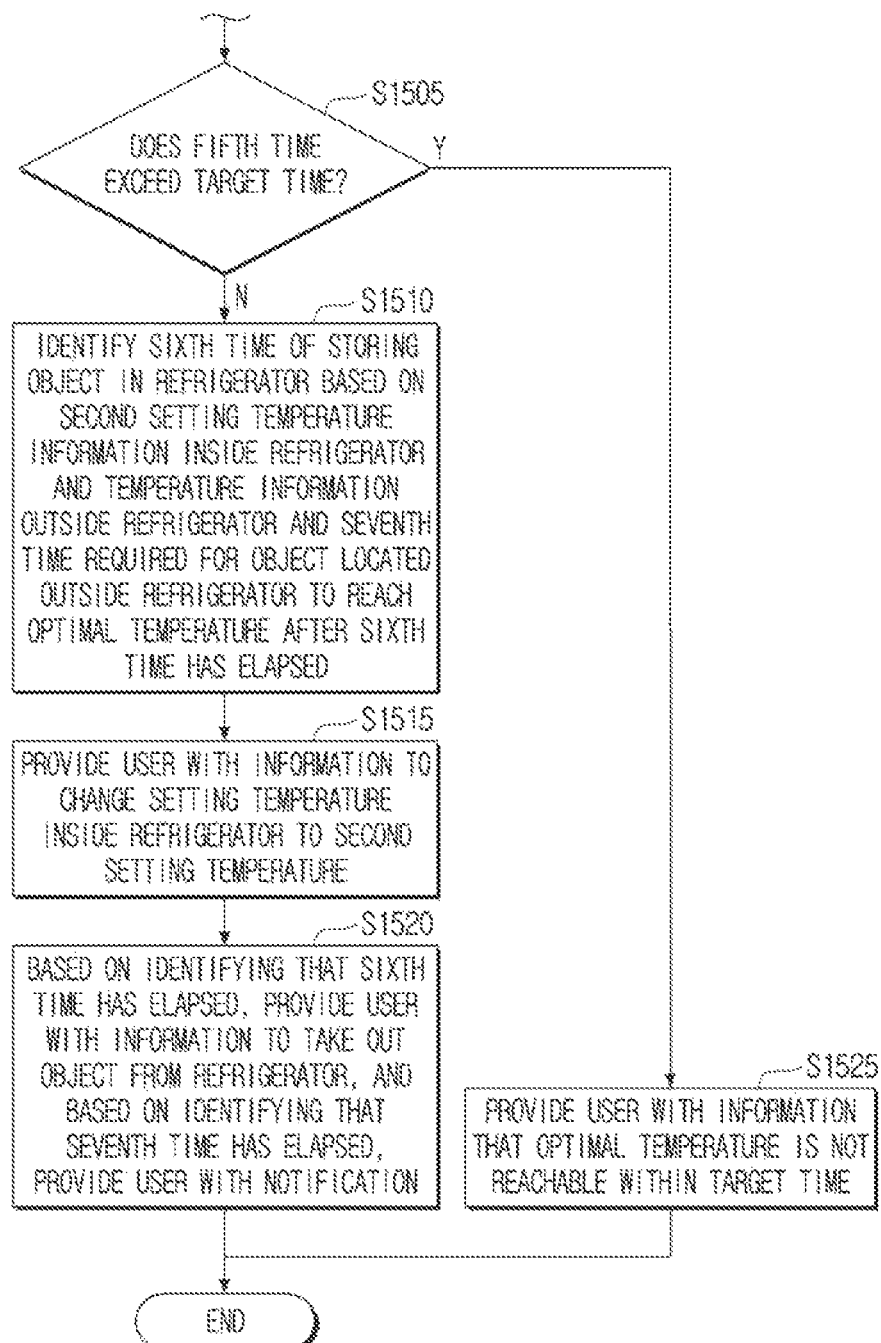
FIG. 15 is a diagram illustrating an operation in which, when a fifth time does not exceed a target time, information indicating that the refrigerator changes a set temperature inside the refrigerator to a second set temperature is provided to the user, according to one or more embodiments of the disclosure.

FIG. 15 is a diagram illustrating an operation in which, when a fifth time does not exceed a target time, information indicating that the refrigerator 100 changes a set temperature inside the refrigerator 100 to a second set temperature is provided to the user, according to one or more embodiments of the disclosure.

Referring to FIG. 15, based on the fifth time not exceeding the target time in operation S1505—N, the processor 150 may identify a sixth time of storing the object in the refrigerator 100 based on second setting temperature information inside the refrigerator 100 and temperature information outside the refrigerator 100 and a seventh time required for the object located outside the refrigerator 100 to reach the optimal temperature after the sixth time have elapsed in operation S1510.

The processor 150 may control the speaker 180 or the display 170 to provide information to the user to change the set temperature inside the refrigerator 100 to the second set temperature in operation S1515.

When the set temperature inside the refrigerator 100 is changed to a second set temperature lower than the first set temperature, the object may reach the optimal temperature within the target time.

Based on identifying that the six time has elapsed, the processor 150 may provide a user with information to take out the object from the refrigerator 100, and based on identifying that the seventh time has elapsed, may provide a user with a notification in operation S1520.

Based on the fifth time exceeding the target time in operation S1505—Y, the processor 150 may provide a user with information that the optimal temperature is not reachable within the target time in operation S1525.

A target time, which is a time taken from a current time point to a time point desired by a user for taste of an object, is set, and when the object is sufficiently stored in the refrigerator 100 for a predetermined time or longer and the current temperature of the object is identified to be lower than the optimal temperature, the control operation of the processor 150 for the refrigerator 100 will be described in conjunction with FIGS. 16 to 18.

Figure 16:
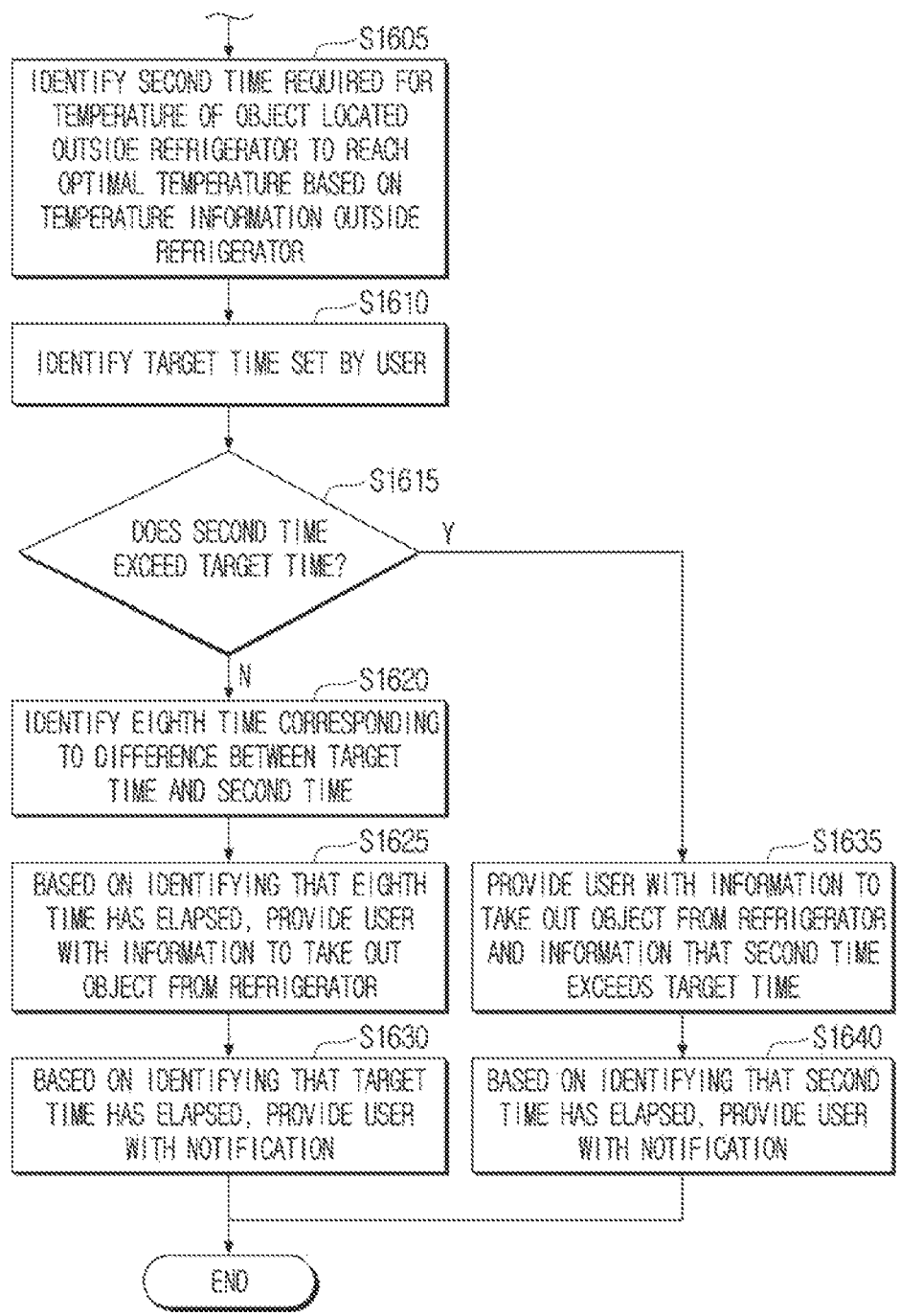
FIG. 16 is a diagram illustrating an operation of a refrigerator when a user sets a target time and the current temperature of an object stored in the refrigerator is the same as a set temperature inside the refrigerator, according to one or more embodiments of the disclosure.

FIG. 16 is a diagram illustrating an operation of a refrigerator 100 when a user sets a target time and the current temperature of an object stored in the refrigerator 100 is the same as a set temperature inside the refrigerator 100, according to one or more embodiments of the disclosure.

Referring to FIG. 16, based on identifying that the current temperature of the object is lower than the optimal temperature, the processor 150 may identify a second time which is taken for the temperature of an object located outside the refrigerator to reach an optimal temperature based on temperature information outside the refrigerator in operation S1605. The current temperature of the object may be the same as the set temperature inside the refrigerator 100, but is not limited thereto.

The processor 150 may identify the target time set by the user in operation S1610. The processor 150 may identify whether the second time exceeds the target time in operation S1615.

Based on identifying that the second time does not exceed the target time in operation S1615—N, the processor 150 may identify an eighth time corresponding to a difference between the target time and the second time in operation S1620.

Figure 17:
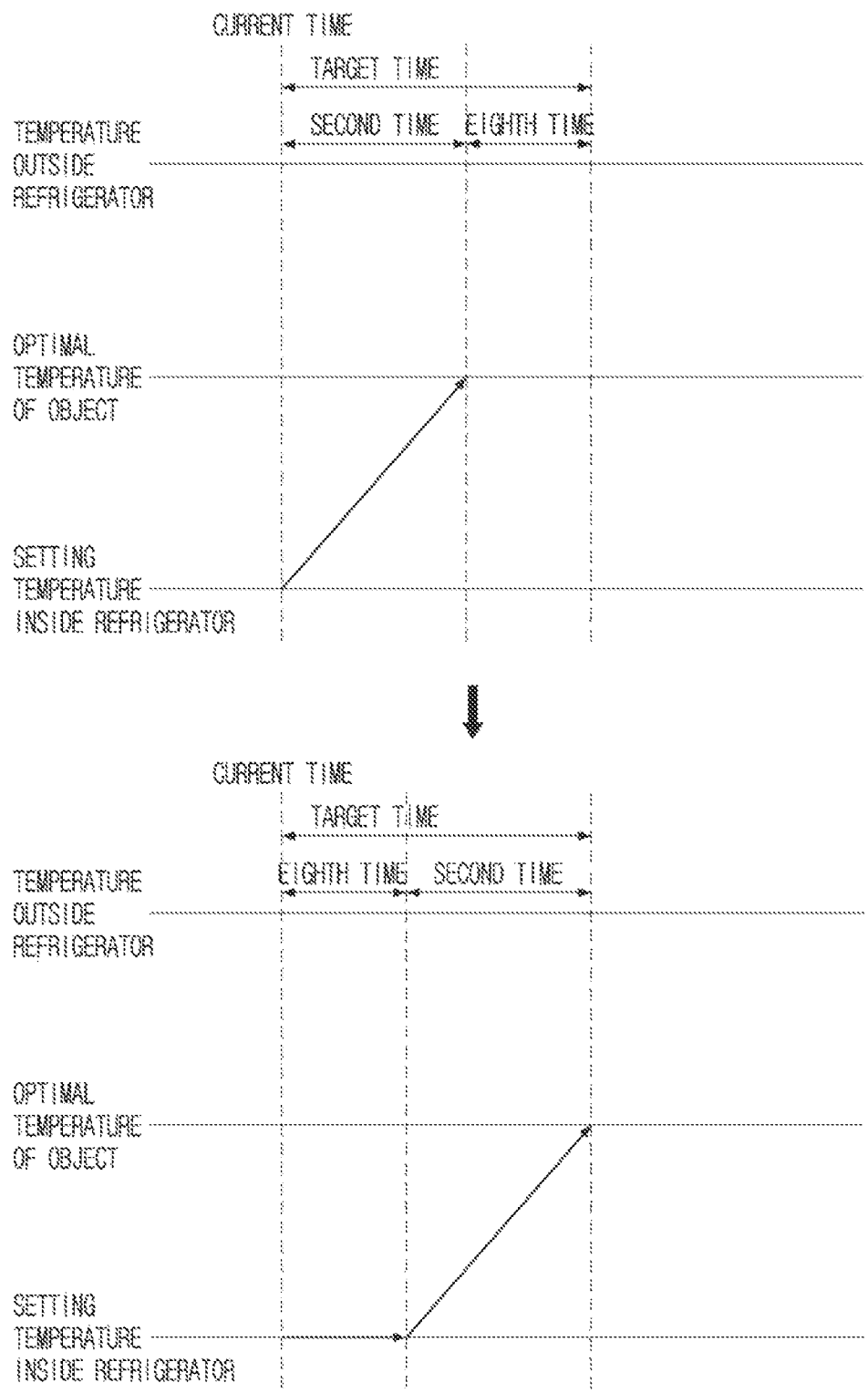
FIG. 17 is a diagram illustrating an operation in which a processor identifies an eighth time when a second time does not exceed a target time, according to one or more embodiments of the disclosure.

FIG. 17 is a diagram illustrating an operation in which a processor 150 identifies an eighth time when a second time does not exceed a target time, according to one or more embodiments of the disclosure.

Referring to FIG. 17, based on the identified second time not exceeding the target time, the processor 150 may identify an eighth time corresponding to a difference between the target time and the second time.

Based on identifying that the eighth time has elapsed, the processor 150 may control the display 170 or speaker 180 to provide a user with information to take out the object from the refrigerator 100 in operation S1625.

The processor 150 may, based on identifying that the target time has elapsed, control the display 170 or the speaker 180 to provide a user with a notification in operation S1630.

If it is identified that the second time exceeds the target time in operation S1615—Y, the processor 150 may control the display 170 or speaker 180 to provide a user with information to take out the object from the refrigerator 100 and information that the second time exceeds the target time in operation S1635.

Figure 18:
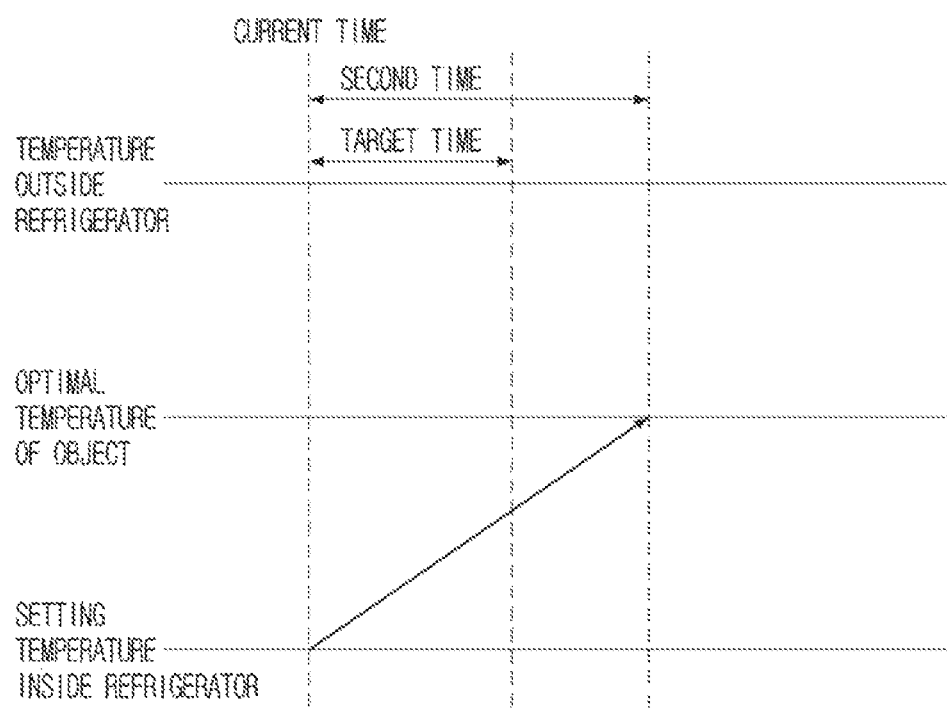
FIG. 18 is a diagram illustrating an operation of a refrigerator when a second time exceeds a target time, according to one or more embodiments of the disclosure.

FIG. 18 is a diagram illustrating an operation of a refrigerator 100 when a second time exceeds a target time, according to one or more embodiments of the disclosure.

Referring to FIG. 18, the processor 150 may control the display 170 or the speaker 180 to provide information indicating that the object needs to be taken out from the refrigerator 100 and information indicating that the second time has exceeded the target time to the user when the time taken to reach the optimal temperature is greater than the target time even when the object is immediately taken out from the refrigerator 100.

The processor 150, based on identifying that the second time elapses, may control the display 170 or the speaker 180 to provide the user with a notification in operation S1640.

Figure 19:
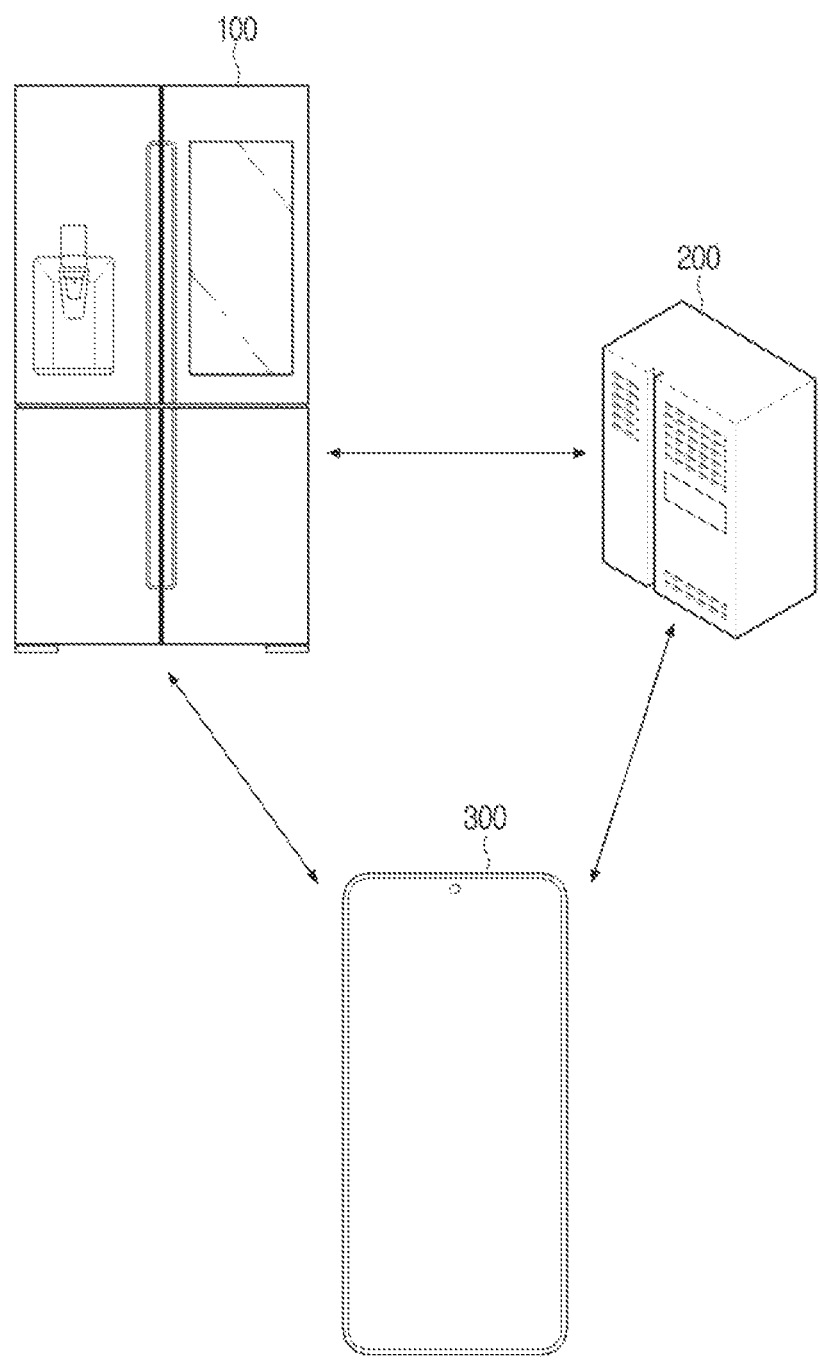
FIG. 19 is a diagram illustrating a method by which a refrigerator performs an operation according to the disclosure by performing communication connection with a server or a user terminal device, according to one or more embodiments of the disclosure.

FIG. 19 is a diagram illustrating a method by which a refrigerator 100 performs an operation according to the disclosure by performing communication connection with a server or a user terminal device, according to one or more embodiments of the disclosure.

Referring to FIG. 19, the processor 150 may perform communication connection with the server 200 or the user terminal device 300 through the communication interface 160 to transmit or receive various information. The server 200 may be a cloud-type server, and may establish a network with a plurality of home appliances by performing a communication connection with a plurality of home appliances.

The processor 150 may perform communication connection with the server 200 or the user terminal device 300 through the communication interface 160 to receive an input signal for providing a notification when the time taken for the object to reach the optimal temperature elapses.

The processor 150 may perform communication connection with the server 200 or the user terminal device 300 through the communication interface 160 to receive type information (for example, type of an object, physical properties of an object, capacity of an object, an optimal temperature of an object, etc.) of an object.

The processor 150 may perform a communication connection with the server 200 or the user terminal device 300 through the communication interface 160, and may receive input information about a target time from the current time point to a time point at which the object reaches the most suitable temperature to taste an object.

The processor 150 may perform a communication connection with the server 200 or the user terminal device 300 through the communication interface 160 to transmit information about taking out the object from the refrigerator 100. The processor 150 performs communication connection with the server 200 or the user terminal device 300 through the communication interface 160 to transmit information for changing the storage location of the object or transmit information to change the internal set temperature of the refrigerator 100 from the first set temperature to the second set temperature.

The processor 150 may perform a communication connection with the server 200 or the user terminal device 300 through the communication interface 160 to transmit a signal notifying that the time taken for the object to reach the optimal temperature has elapsed.

The processor 150 may perform a communication connection with the server 200 or the user terminal device 300 through the communication interface 160 to transmit a signal notifying that the optimal temperature of the object cannot be reached within the target time.

Figure 20:
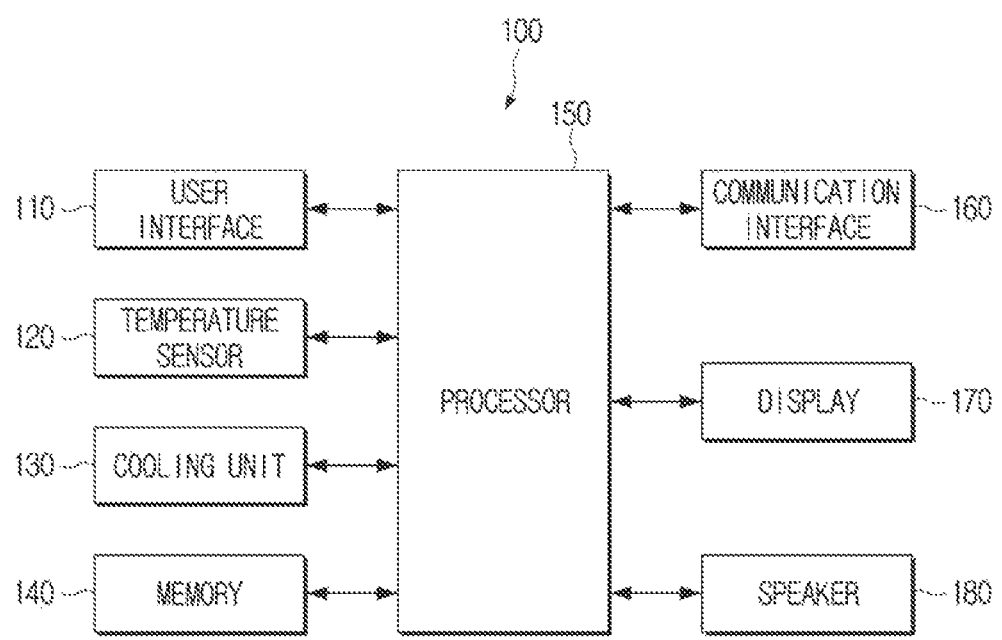
FIG. 20 is a block diagram illustrating a configuration of a refrigerator according to one or more embodiments of the disclosure.

FIG. 20 is a block diagram illustrating a configuration of the refrigerator 100 according to one or more embodiments of the disclosure.

Referring to FIG. 20, the refrigerator 100 may further include the communication interface 160, the display 170, and the speaker 180 in addition to the user interface 110, the temperature sensor 120, the cooling unit 130, the memory 140, and the processor 150 described with reference to FIG. 2.

The communication interface 160 may include a wireless communication interface, a wired communication interface, and/or an input interface. The wireless communication interface may communicate with various external devices by using a wireless communication technology or a mobile communication technology. The wireless communication technology may include, for example, Bluetooth, Bluetooth low energy, CAN communication, Wi-Fi, Wi-Fi Direct, Ultrawide Band (UWB), ZigBee, Infrared Data Association (IrDA), or Near Field Communication (NFC), and the mobile communication technology may include 3GPP, Wi-Max, long term evolution (LTE), 5G, or the like.

The wireless communication interface may be implemented by using an antenna, a communication chip, and/or a substrate capable of transmitting an electromagnetic wave to the outside or receiving an electromagnetic wave transmitted from the outside.

The wired communication interface may communicate with various external devices based on a wired communication network. The wired communication network may be implemented using, for example, a physical cable such as a pair cable, a coaxial cable, an optical fiber cable, or an Ethernet cable.

Any one of the wireless communication interface and wired communication interface may be omitted according to one or more embodiments. Accordingly, the refrigerator 100 may include only the wireless communication interface or may include only the wired communication interface. In addition, the refrigerator 100 may include an integrated communication interface supporting both a wireless connection by the wireless communication interface and a wired connection by the wired communication interface.

The refrigerator 100 is not limited to the case of including one communication interface for performing one type of communication connection, and may include a plurality of communication interfaces for performing a communication connection in a plurality of ways.

The processor 150 may perform communication connection with the server 200 or the user terminal device 300 through the communication interface 160 to receive an input signal for providing a notification when the time taken for the object to reach the optimal temperature elapses.

The processor 150 may perform communication connection with the server 200 or the user terminal device 300 through the communication interface 160 to receive type information (for example, a type of an object, physical properties of the object, a capacity of the object, an optimal temperature of the object, and the like) of the object.

The processor 150 may perform a communication connection with the server 200 or the user terminal device 300 through the communication interface 160, and may receive input information about a target time from a current time point to a time point at which the object reaches the most suitable temperature for tasting the object.

The processor 150 may perform communication connection with the server 200 or the user terminal device 300 through the communication interface 160 to transmit information about taking out the object from the refrigerator 100. The processor 150 may transmit information for changing the storage position of the object by performing a communication connection with the server 200 or the user terminal device 300 through the communication interface 160, or transmit information to change the internal set temperature of the refrigerator 100 from the first set temperature to the second set temperature.

The processor 150 may perform a communication connection with the server 200 or the user terminal device 300 through the communication interface 160 to transmit a signal notifying that the time taken takes for the object to reach the optimal temperature has elapsed.

The processor 150 performs a communication connection with the server 200 or the user terminal device 300 through the communication interface 160 to transmit a signal notifying that the optimal temperature of the object cannot be reached within a target time.

The display 170 may include various types of display panels such as a liquid crystal display panel (LCD) panel, an organic light emitting diodes (OLED) display panel, an active-matrix organic light-emitting diode (AM-OLED), liquid crystal on silicon (LcoS), quantum dot light-emitting diode (QLED), a digital light processing (DLP), a plasma display panel (PDP) panel, an inorganic LED panel, and a micro LED panel, but is not limited thereto.

The display 170 may configure a touch screen together with the touch panel or may be made of a flexible panel.

The display 170 may have various forms such as a circular shape, an oval shape, and a polygon, and may be located in one area of the surface of the refrigerator 100. The surface of the refrigerator 100 may refer to an outer surface of the refrigerator 100, but is not limited thereto.

The processor 150 may control the display 170 to display GUI about information to take out the object from the refrigerator 100.

The processor 150 may control the display 170 to transmit information to change the storage position of the object or to display a GUI regarding information to change the internal set temperature of the refrigerator 100 from the first set temperature to the second set temperature.

The processor 150 may control the display 170 to display a GUI indicating that time taken for the object to reach the optimal temperature has elapsed.

The processor 150 may control the display 170 to display a GUI indicating that the object may not reach the optimal temperature within a target time.

The speaker 180 may include a tweeter for playing a high-pitched sound band sound; a mid-range for playing a middle-range sound band sound; a woofer for playing a low-pitched sound band sound; a subwoofer for playing a very low-pitched sound band sound; an enclosure for controlling resonance; a crossover network for dividing an electric signal frequency inputted to the speaker 180 for each band, and the like.

The speaker 180 may output an acoustic signal to the outside of the electronic device. The speaker 180 may output multimedia playback, recording playback, various notification sounds, voice messages, and the like. The electronic device may include an audio output device such as the speaker 180, but may include an output device such as an audio output terminal. In particular, the speaker 180 may provide obtained information, information processed/produced based on the obtained information, a response result or an operation result with respect to the user voice, and the like in a voice form.

The processor 150 may control the speaker 180 to output voice about information to take out the object from the refrigerator 100.

The processor 150 may control the speaker 180 to transmit information to change the storage position of the object or output a voice related to the information to change the internal set temperature of the refrigerator 100 from the first set temperature to the second set temperature.

The processor 150 may control the speaker 180 to output voice indicating that the time taken for the object to the optimal temperature has elapsed.

The processor 150 may control the speaker 180 to output voice indicating that the object may not reach the optimal temperature within the target time.

The refrigerator 100 may further include a camera (not shown) and a microphone (not shown).

The camera may refer to a module capable of capturing a still image and a video. According to one or more embodiments, the camera module may include one or more lenses, an image sensor, an image signal processor 150, or a flash.

The processor 150 may acquire an image of an object entering the refrigerator 100 through a camera. The processor 150 may acquire type information of the object based on the acquired image. The processor 150 may obtain type information of an object included in an image by inputting the obtained image to a first neural network model (e.g., an image classification model).

The microphone may refer to a module for acquiring a sound and converting the sound into an electrical signal, and may be a condenser microphone, a ribbon microphone, a moving coil microphone, a piezoelectric element microphone, a carbon microphone, and a Micro Electro Mechanical System (MEMS) microphone. In addition, it may be implemented in the manner of omnidirectional, bi-directional, unidirectional, sub-cardioid, super cardioid, hyper cardioid.

The processor 150 may obtain information on a user's voice command through a microphone. Specifically, the processor 150 may recognize a voice of a user by using a speech-to-text (STT) module for a user's voice sensed through the microphone, and identify a command and a meaning included in the user voice. The processor 150 may provide a notification when a time taken for the temperature of the object to reach the optimal temperature elapses based on a command and a meaning included in the identified user voice.

In addition, the processor 150 may obtain type information of an object stored in the refrigerator 100 based on the information on a user voice command acquired through the microphone.

FIG. 21 is a flowchart illustrating an operation of the refrigerator 100 according to one or more embodiments of the disclosure.

The refrigerator 100 may obtain type information of the object and current temperature information of the object stored in the refrigerator 100 in operation S2110.

The object may be a liquor containing wine, but is not limited thereto, and may include various food, beverages, alcoholic beverages, food materials, and the like.

The refrigerator 100 may obtain current temperature information of an object based on temperature information outside the refrigerator 100 and first setting temperature information inside the refrigerator 100.

The refrigerator 100 may compare a current temperature of the object with an optimal temperature of the object based on the type information and the current temperature information in operation S2120. The optimal temperature of the object may mean temperature most suitable for tasting the object.

Based on identifying that the current temperature of the object is higher than the optimal temperature, the refrigerator 100 may identify a first time taken for the temperature of the object located inside the refrigerator 100 to reach the optimal temperature based on first setting temperature information inside the refrigerator 100 in operation S2130.

Based on identifying that the current temperature of the object is lower than the optimal temperature, the refrigerator 100 may identify a second time required for the temperature of the object located outside the refrigerator 100 to reach the optimal temperature is identified based on temperature information outside the refrigerator 100 in operation S2140.

Based on identifying that the current temperature of the object is lower than the optimal temperature, the refrigerator 100 may provide a user with information to take out the object from the refrigerator 100.

The refrigerator 100 may control the display 170 or the speaker 180 to provide a notification to the user based on identifying that the first time or the second time has elapsed in operation S2150.

The function related to AI may operate through the processor 150 and the memory 140 of the electronic device.

The processor 150 may be configured with one or a plurality of processors 150. The one or more processors 150 may include at least one of a central processing unit (CPU), a graphic processing unit (GPU), and a neural processing unit (NPU), but is not limited to the above-described processor 150.

The CPU is a general-purpose processor capable of performing an artificial intelligence operation as well as a general operation, and may efficiently execute a complex program through a multi-layer cache structure. The CPU is advantageous in a serial processing method which enables organic connection between a previous calculation result and a next calculation result through sequential calculation. The general-purpose processor is not limited to the above-described example except for the above-described CPU.

The GPU is a processor for mass calculation, such as a floating point operation used for graphics processing, and may perform large-scale operations in parallel by integrating the cores in large quantities. In particular, the GPU may be advantageous in a parallel processing scheme such as a convolution operation as compared to a CPU. In addition, the GPU may be used as a co-processor for supplementing functions of the CPU. The processor 150 for mass calculation is not limited to the above-described example except for a case in which the above-described GPU is specified.

NPU is a processor specialized for artificial intelligence calculation using an artificial neural network, and may implement each layer constituting the artificial neural network as hardware (for example, silicon). Since the NPU is designed to be specialized according to a requirement specification of the company, the degree of freedom is lower than that of a CPU or a GPU, but an artificial intelligence operation for requesting a company may be efficiently processed. As a processor specialized for the artificial intelligence operation, the NPU may be implemented in various forms such as a Tensor Processing Unit (TPU), an Intelligence Processing Unit (IPU), and a Vision Processing Unit (VPU). The artificial intelligence processor is not limited to the above-described example except for the case in which the above-described NPU is specified.

Also, the one or more processors 150 may be implemented with a System on Chip (SoC). The SoC may further include a network interface such as a bus for data communication between the processor 150 and the memory 140, in addition to the one or more processors 150.

When a plurality of processors 150 are included in a system on chip (SoC) included in the electronic device, the electronic device may perform an operation related to artificial intelligence (for example, an operation related to learning or inference of an artificial intelligence model) by using some of the plurality of processors 150. For example, the electronic device may perform an operation related to artificial intelligence by using at least one of a GPU, an NPU, a VPU, a TPU, and a hardware accelerator specialized for an artificial intelligence operation such as a convolution operation, a matrix multiplication operation, and the like among a plurality of processors 150. However, this is merely an embodiment, and an operation related to artificial intelligence may be processed by using a general-purpose processor like CPU.

Also, the electronic device may perform an operation on a function related to artificial intelligence by using a multi-core (for example, a dual core, a quad core, etc.) included in one processor 150. In particular, the electronic device may perform an artificial intelligence operation such as a convolution operation and a matrix multiplication operation in parallel by using a multi-core included in the processor 150.

One or a plurality of processors 150 controls the input data to be processed according to a predefined operation rule or an artificial intelligence model stored in the memory 140. The predefined operation rule or the artificial intelligence model is made through learning.

By applying a learning algorithm to a plurality of learning data, a predefined operating rule or AI model of a desired characteristic is made. The learning may be performed in a device itself in which AI according to one or more embodiments is performed, and/or may be implemented through a separate server/system.

The AI model may include a plurality of neural network layers. Each layer has a plurality of weight values, and performs a layer operation through calculation of a previous layer and at least one defined operation. Examples of neural networks include convolutional neural network (CNN), deep neural network (DNN), recurrent neural network (RNN), restricted Boltzmann Machine (RBM), deep belief network (DBN), bidirectional recurrent deep neural network (BRDNN), deep Q-networks, and transformer and are not limited thereto unless otherwise specified.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning, and the learning algorithm in this disclosure is not limited thereto unless otherwise specified.

In addition, according to one or more embodiments, a method according to one or more embodiments may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product (e.g., downloadable app) may be at least stored temporarily in a storage medium such as a server of a manufacturer, a server of an application store, or a memory of a relay server, or temporarily generated.

While embodiments of the disclosure have been shown and described, the disclosure is not limited to the aforementioned specific embodiments, and it should be apparent that various modifications can be made by those having ordinary skill in the technical field to which the disclosure belongs, without departing from the gist of the disclosure as claimed by the appended claims.

What is claimed is:

1. A refrigerator comprising:
   a user interface;
   a temperature sensor configured to sense a temperature outside the refrigerator;
   a cooler configured to adjust a temperature inside the refrigerator;
   a memory configured to store at least one instruction; and
   one or more processors configured to execute the at least one instruction to:
   obtain type information of an object in the refrigerator and current temperature information of the object, compare a current temperature of the object with a first temperature of the object based on the type information and the current temperature information, based on identifying that the current temperature of the object is higher than the first temperature, identify a first time for the temperature of the object inside the refrigerator to reach the first temperature based on a first setting temperature inside the refrigerator, based on identifying that the current temperature of the object is lower than the first temperature, identify a second time for the temperature of the object to reach the first temperature after the object is removed from the refrigerator based on outside temperature information of the refrigerator, and based on identifying that at least one of the first time or the second time has elapsed, provide a notification.

2. The refrigerator of claim 1, wherein the one or more processors are further configured to execute the at least one instruction to:

based on identifying that the current temperature of the object is lower than the first temperature, provide a notification to remove the object from the refrigerator.

3. The refrigerator of claim 1, wherein the one or more processors are further configured to execute the at least one instruction to obtain the current temperature information of the object based on information about at least one of the temperature outside the refrigerator or the first setting temperature inside the refrigerator.

4. The refrigerator of claim 1, wherein the one or more processors are further configured to execute the at least one instruction to:

identify a target time set via the user interface;

based on the identified first time not exceeding the target time, identify a third time for storing the object in the refrigerator based on the first setting temperature inside the refrigerator and the outside temperature information of the refrigerator, and identify a fourth time for the object to reach the first temperature after the third time has elapsed; and based on identifying that the third time has elapsed, output a notification to remove the object from the refrigerator; and based on identifying that the fourth time has elapsed, provide a notification that the fourth time has elapsed.

5. The refrigerator of claim 1, wherein the one or more processors are further configured to execute the at least one instruction to:

identify a target time set using the user interface, based on the identified first time exceeding the target time, identify a fifth time for the object located inside the refrigerator to reach the first temperature based on a second setting temperature inside the refrigerator, and based on the fifth time not exceeding the target time, identify a sixth time of storing the object in the refrigerator based on the second setting temperature inside the refrigerator and the outside temperature information of the refrigerator and a seventh time required for the object located outside the refrigerator to reach the first temperature after the sixth time has elapsed, based on identifying that the sixth time has elapsed, provide a notification to remove the object from the refrigerator, and based on identifying that the seventh time has elapsed, provide a notification that the seventh time has elapsed.

6. The refrigerator of claim 5, wherein the one or more processors are further configured to execute the at least one instruction to, based on the fifth time exceeding the target time, provide a notification that the first temperature is not reachable within the target time.

7. The refrigerator of claim 5, wherein the one or more processors are further configured to execute the at least one instruction to, based on the fifth time not exceeding the target time, provide a notification to change a storage location of the object to a storage location corresponding to the second setting temperature.

8. The refrigerator of claim 5, wherein the one or more processors are further configured to execute the at least one instruction to, based on the fifth time not exceeding the target time, provide a notification to change a setting temperature inside the refrigerator to the second setting temperature.

9. The refrigerator of claim 1, wherein the one or more processors are further configured to execute the at least one instruction to:

identify a target time set using the user interface, based on the identified second time not exceeding the target time, identify an eighth time corresponding to a difference between the target time and the second time, based on identifying that the eighth time has elapsed, provide a notification to remove the object from the refrigerator, and based on identifying that the target time has elapsed, provide a notification that the target time has elapsed.

10. The refrigerator of claim 1, wherein the one or more processors are further configured to execute the at least one instruction to:

identify a target time set using the user interface, based on the identified second time exceeding the target time, provide a notification to remove the object from the refrigerator and information that the second time exceeds the target time, and based on identifying that the second time has elapsed, provide a notification that the second time has elapsed.

11. The refrigerator of claim 1, wherein the one or more processors are further configured to execute the at least one instruction to, based on identifying that the current temperature of the object is same as the first temperature, provide a notification to remove the object from the refrigerator.

12. The refrigerator of claim 1, wherein the first temperature of the object is higher than the first setting temperature inside the refrigerator and lower than the temperature outside the refrigerator.

13. A method of controlling a refrigerator, the method comprising:

obtaining type information of an object in the refrigerator and current temperature information of the object;

comparing a current temperature of the object with a first temperature of the object based on the type information and the current temperature information;

based on identifying that the current temperature of the object is higher than the first temperature, identifying a first time for the temperature of the object inside the refrigerator to reach the first temperature based on a first setting temperature inside the refrigerator;

based on identifying that the current temperature of the object is lower than the first temperature, identifying a second time for the temperature of the object to reach the first temperature after the object is removed from the refrigerator based on outside temperature information of the refrigerator; and based on identifying that at least one of the first time or the second time has elapsed, providing a notification.

14. The method of claim 13, wherein the identifying the second time comprises, based on identifying that the current temperature of the object is lower than the first temperature, providing a notification to remove the object from the refrigerator.

15. The method of claim 13, wherein the obtaining the current temperature information of the object comprises obtaining the current temperature information of the object based on information about at least one of the temperature outside the refrigerator or the first setting temperature inside the refrigerator.

16. The method of claim 13, further comprising:
identifying a target time set via the user interface,
wherein the identifying the first time comprises, based on the identified first time not exceeding the target time, identifying a third time for storing the object in the refrigerator based on the first setting temperature inside the refrigerator and the outside temperature information of the refrigerator, and identifying a fourth time for the object to reach the first temperature after the third time has elapsed;
wherein the providing the notification comprise,
based on identifying that the third time has elapsed, output a notification to remove the object from the refrigerator; and
based on identifying that the fourth time has elapsed, providing a notification that the fourth time has elapsed.

17. The method of claim 13, further comprising:
identifying a target time set using the user interface,
wherein the identifying the first time comprises,
based on the identified first time exceeding the target time, identifying a fifth time for the object located inside the refrigerator to reach the first temperature based on a second setting temperature inside the refrigerator, and
based on the fifth time not exceeding the target time, identifying a sixth time of storing the object in the refrigerator based on the second setting temperature inside the refrigerator and the outside temperature information of the refrigerator and a seventh time required for the object located outside the refrigerator to reach the first temperature after the sixth time has elapsed, wherein the providing the notification comprise,
based on identifying that the sixth time has elapsed, providing a notification to remove the object from the refrigerator, and
based on identifying that the seventh time has elapsed, providing a notification that the seventh time has elapsed.

18. The method of claim 17, wherein the providing the notification comprise,
based on the fifth time exceeding the target time, providing a notification that the first temperature is not reachable within the target time.

19. The method of claim 17, wherein the providing the notification comprise,
based on the fifth time not exceeding the target time, providing a notification to change a storage location of the object to a storage location corresponding to the second setting temperature.

20. A non-transitory computer-readable recording medium storing instructions that, when executed by at least one processor of a refrigerator, cause the at least one processor to:
obtaining type information of an object in the refrigerator and current temperature information of the object;
comparing a current temperature of the object with a first temperature of the object based on the type information and the current temperature information;
based on identifying that the current temperature of the object is higher than the first temperature, identifying a first time for the temperature of the object inside the refrigerator to reach the first temperature based on a first setting temperature inside the refrigerator;
based on identifying that the current temperature of the object is lower than the first temperature, identifying a second time for the temperature of the object to reach the first temperature after the object is removed from the refrigerator based on outside temperature information of the refrigerator; and
based on identifying that at least one of the first time or the second time has elapsed, providing a notification.

* * * * *